(12) United States Patent
Suzuki

(10) Patent No.: US 8,773,699 B2
(45) Date of Patent: Jul. 8, 2014

(54) INFORMATION PROCESSING APPARATUS, PRINTING SYSTEM, AND METHOD FOR CONTROLLING THE SAME

(75) Inventor: Shinya Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 13/396,508

(22) Filed: Feb. 14, 2012

(65) Prior Publication Data

US 2012/0224197 A1 Sep. 6, 2012

(30) Foreign Application Priority Data

Mar. 1, 2011 (JP) ................................. 2011-044392

(51) Int. Cl.
*G06F 15/00* (2006.01)
*G06K 1/00* (2006.01)

(52) U.S. Cl.
USPC ........................................ 358/1.15; 358/1.13

(58) Field of Classification Search
CPC ..... G06F 3/1205; G06F 3/122; G06F 3/1225; G06F 3/1244; G06K 15/002; G06K 15/4005
USPC .................. 358/1.1–1.9, 1.11–1.18
See application file for complete search history.

(56) References Cited

U.S. PATENT DOCUMENTS

| 5,754,747 A | * | 5/1998 | Reilly et al. | 358/1.15 |
| 2007/0146778 A1 | * | 6/2007 | Kitagata et al. | 358/1.15 |
| 2010/0094979 A1 | * | 4/2010 | Azami | 709/221 |

FOREIGN PATENT DOCUMENTS

| JP | 2006-099714 | * | 4/2006 |
| JP | 4033857 B2 | | 1/2008 |

* cited by examiner

*Primary Examiner* — King Poon
*Assistant Examiner* — Ibrahim Siddo
(74) *Attorney, Agent, or Firm* — Canon USA, Inc., IP Division

(57) ABSTRACT

An information processing apparatus includes a storage unit, an installation unit, a processing unit, and a transmission unit. The storage unit stores data to be printed in an intermediate format independent of a specific model of a printing apparatus. The installation unit installs a printer driver corresponding to a printing apparatus in response to a request from the printing apparatus. The processing unit causes the printer driver installed by the installation unit to generate, from the intermediate-format data, data capable of recognizing output settings used for actual printing apparatus printing and outputs the generated data to a storage area inside the information processing apparatus. The transmission unit acquires information about the output settings from the data output by the processing unit and transmits the information about the output settings to the printing apparatus. The printing apparatus displays the information about the output settings of the data to be printed.

12 Claims, 15 Drawing Sheets

FIG.10
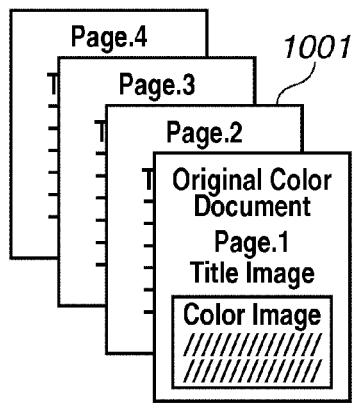
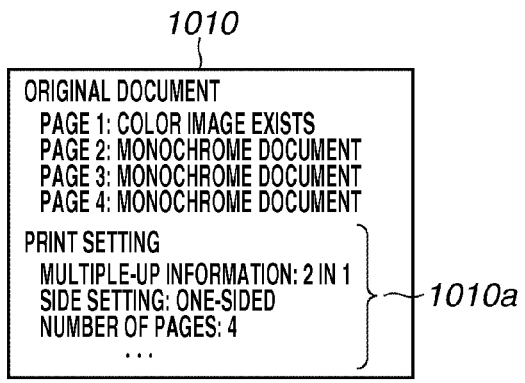
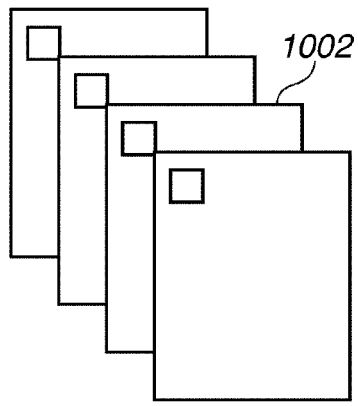
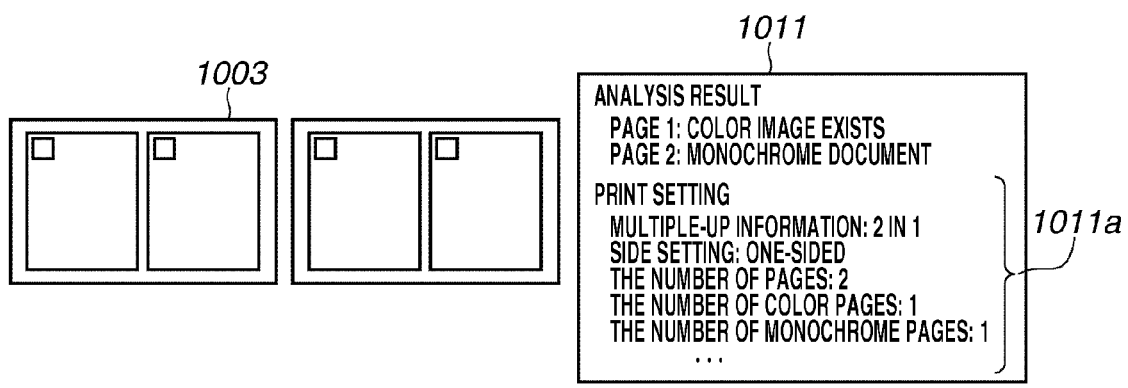

FIG.14A

PULL PRINTING

| | Taro Yamada | UPDATE | NUMBER OF DOCUMENTS 7 |

| DOCUMENT NAME | COLOR MODE | TWO-SIDED | MULTIPLE-UP | NUMBER OF COPIES | DATE AND TIME |
|---|---|---|---|---|---|
| ■ FINANCIAL STATEMENT | COLOR | ONE-SIDED | 1 in 1 | 1 COPY | 01/14 10:19 |
| ☐ ESTIMATE | MONOCHROME | ONE-SIDED | 1 in 1 | 5 COPIES | 01/14 10:19 |
| ☐ LEAVE APPLICATION FORM | MONOCHROME | TWO-SIDED | 1 in 1 | 1 COPY | 01/14 10:19 |
| ☐ PROJECT PROPOSAL | COLOR | ONE-SIDED | 1 in 1 | 1 COPY | 01/14 10:20 |
| ☐ 11111111112222222222333333333344444444444 | MONOCHROME | ONE-SIDED | 1 in 1 | 1 COPY | 01/14 10:20 |
| ☐ ABCDEEFGHIJKLMNOP... | MONOCHROME | ONE-SIDED | 1 in 1 | 1 COPY | 01/14 10:21 |
| ☐ DISCUSSION MATERIALS | COLOR | ONE-SIDED | 2 in 1 | 1 COPY | 01/14 10:21 |

1/1

| SELECT ALL | CANCEL SELECTION | DELETE | CHANGE SETTING | PRINT |

1330

LOGOUT

FIG.14B

PULL PRINTING

1340 — COLOR MODE: ☐ MONOCHROME ☑ COLOR
1341 — TWO-SIDED: ONE-SIDED: ▼
1342 — MULTIPLE-UP: 1 in 1 ▼
1343 — NUMBER OF COPIES: 1
1344 — THE NUMBER OF PAGES: 2
1346
1345 — THE NUMBER OF COLOR PAGES: 1    THE NUMBER OF MONOCHROME PAGES: 1
1349
1347 — ☑ DELETE DOCUMENT AFTER PRINTING    SETTING CHANGE CONFIRMATION    START PRINTING
1348    LOGOUT

INFORMATION PROCESSING APPARATUS, PRINTING SYSTEM, AND METHOD FOR CONTROLLING THE SAME

BACKGROUND OF THE INVENTION

1. Field of the Invention

The present invention relates to the control of a pull printing system in which a user sends a request to print data temporarily stored in a server from a printing apparatus to allow the printing apparatus to output the print data acquired according to the request.

2. Description of the Related Art

Japanese Patent No. 4033857 discusses a system, as one of pull printing systems, in which a user sends a request to print page-description language (PDL) data temporarily stored in a server from a printing apparatus.

The printing system allows the user to output print data not to a specific printing apparatus but from a desired printing apparatus at the time of printing from an application. At this point, PDL data temporarily stored in the server are analyzed to allow the user to confirm print setting on the desired printing apparatus.

A conventional pull printing system is capable of analyzing the PDL data using an analysis program adapted to the model of a targeted printing apparatus and the type of PDL and providing print setting information for the user.

For example, assume that the print setting of 4-page data is set to 2in1 and printing is performed by the conventional pull printing system. Herein, PDL data are not analyzed and the conventional pull printing system provides information of mere "4-page 2in1." For this reason, the conventional pull printing system does not analyze PDL data not to allow providing such detailed information as to indicate output settings to be actually printed by a printing apparatus such as the total number of pages, the number of color pages, and the number of monochrome pages after rendering. Specifically, the conventional pull printing system is not capable of providing detailed information such as "the total number of pages being 2 pages, the number of color pages being 1 page, and the number of monochrome pages being 1 page" as the result of rendering.

Information about the output result needs to be derived by the panel application of the printing apparatus to acquire such detail information. A method for deriving the information is different for each PDL and model. Therefore, it is impractical to previously implement a configuration for deriving information about the output result by the panel application of the printing apparatus onto the printing apparatus in total consideration of combinations of PDLs and a large number of models.

Also in a case where information about the output result is derived by the service of a print server, the print server performs the above processing each time the print server receives a request from the printing apparatus to put a heavy burden on the print server, which may affect the performance thereof.

SUMMARY OF THE INVENTION

The present invention is directed to a printing system for storing a print job in the form of an intermediate format data independent of a printing apparatus of a specific model and to a method capable of correctly providing a user with more detailed information about the print job prior to outputting a print result.

According to an aspect of the present invention, an information processing apparatus includes a storage unit configured to store data to be printed in an intermediate format independent of a specific model of a printing apparatus, an installation unit configured to install a printer driver corresponding to a printing apparatus in response to a request from the printing apparatus, a processing unit configured to cause the printer driver installed by the installation unit to generate, from the intermediate-format data, data capable of recognizing output settings used for actual printing by the printing apparatus and output the generated data to a storage area inside the information processing apparatus, and a transmission unit configured to acquire information about the output settings from the data output by the processing unit and to transmit the information about the output settings to the printing apparatus, wherein the printing apparatus displays the information about the output settings of the data to be printed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 is a schematic diagram illustrating an example of the process for processing the intermediate-format print job in the printing system according to the exemplary embodiment.

FIGS. 14A and 14B illustrate examples of screens displayed on the operation unit of the image forming apparatus.

DESCRIPTION OF THE EMBODIMENTS

Various exemplary embodiments, features, and aspects of the invention will be described in detail below with reference to the drawings.

Figure 1:
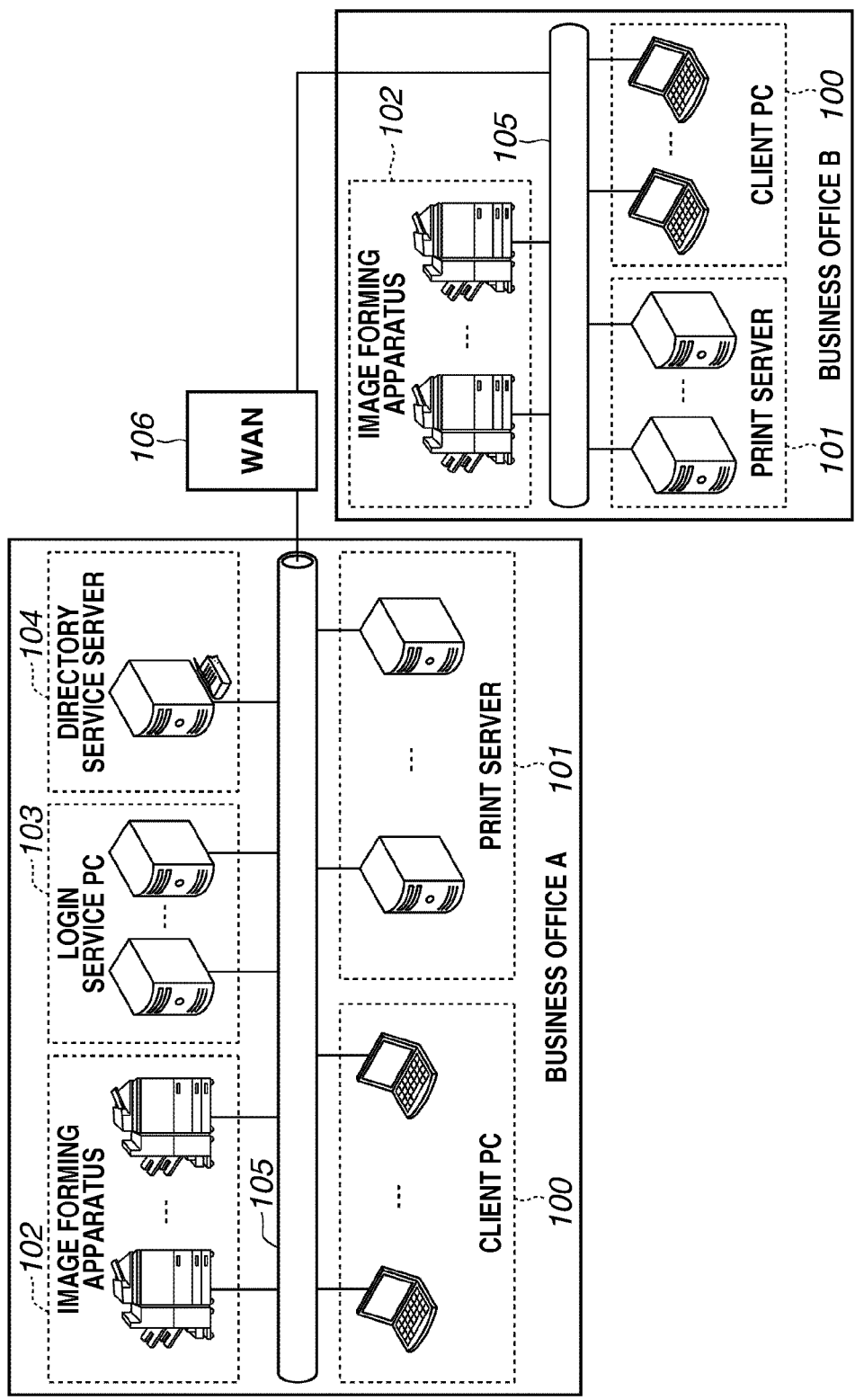
FIG. 1 illustrates an example of configuration of a printing system according to an exemplary embodiment.

FIG. 1 illustrates an example of configuration of a printing system according to an exemplary embodiment.

As illustrated in a "business office A," the printing system according to the present exemplary embodiment is configured such that one or a plurality of client personal computers (PC) 100 (for each user, for example), one or a plurality of print servers 101 (installed for each floor, for example), one or a plurality of image forming apparatuses (printing apparatus) 102 (installed for each floor, for example), one or a plurality of login service PCs 103 (installed for each floor, for example), and a directory service server 104 are communicatively connected with one another via a local area network (LAN) 105.

A virtual printer driver is installed in the client PC 100. The virtual printer driver generates an intermediate-format print job independent of an image forming apparatus of a specific model based on the date received from a client application and transmits the print job to the print server 101.

The intermediate-format print job refers to print data in which specifications regarding a format are published and of which format is easily reedited. For example, the intermediate-format print job refers to Enhanced Metafile Spool Format (EMFSPOOL format), Portable Document Format (PDF), and Extensible Markup Language (XML) Paper Specification (XPS).

The present exemplary embodiment is described using the EMFSPOOL format. However, other intermediate-format print data such as the XPS and the PDF may be used.

The print server 101 stores the print job received from the client PC 100 in a predetermined storage location. The print server 101 includes a job management database (hereinafter referred to as job management DB) which stores and manages metadata and print job related to the print setting.

The print server 101 processes the rendering data of the print job which are stored in and managed by the job management DB, generates PDL data utilizing the metadata and the processed EMFSPOOL-format print job, and analyses the generated PDL data. The print server 101 generates print job list data from the metadata and the analysis results and transfers the print job list data to the image forming apparatus 102.

When the print server 101 receives information about the change of the print setting related to the print job included in the print job list from the image forming apparatus 102, the print server 101 updates the metadata which are stored in and managed by the job management DB 403 (in FIG. 4) based on the received information about the change of the print setting, generates the PDL data again, and analyses the PDL data. The print server 101 generates print setting information from the analysis results and transfers the print setting information about the targeted job to the image forming apparatus 102.

When the print server 101 receives print instructions related to the print job included in the print job list from the image forming apparatus 102, the print server 101 causes the printer driver to execute print processing utilizing the print job and the metadata stored in the predetermined storage location.

The login service PC 103 performs authentication processing (referred to as single sign-on (SSO)) as the login service of the image forming apparatus 102 based on the login user name and password of the client PC 100 which are stored in and managed by the directory service server 104 (for example, the login user name and password of Windows (registered trademark) of Microsoft Corporation). For example, the login service PC 103 uses a personal computer including Security Agent produced by Canon Inc.

The directory service server 104 centrally stores and manages hardware resources such as a server, a client, and a printer on the network and various pieces of information such as the attributes of users using the resources (including the login user name and password of the client PC100, (for example, the login user name and password of Windows (registered trademark) of Microsoft Corporation) and the access right of the user using the hardware resources. For example, the directory service server 104 has an active directory function.

The printing system of the present exemplary embodiment may be configured such that the "business office A" is connected with one or a plurality of "business office B," each being configured such that one or a plurality of client PC 100, one or a plurality of print servers 101, and one or a plurality of image forming apparatuses 102 are connected with one another via the LAN 105, via a wide area network (WAN) 106.

A hardware configuration of the information processing apparatus applicable to the PC 100, the print server 101, the login service PC 103, and the directory service server 104 illustrated in FIG. 1 is described below with reference to FIG. 2.

Figure 2:
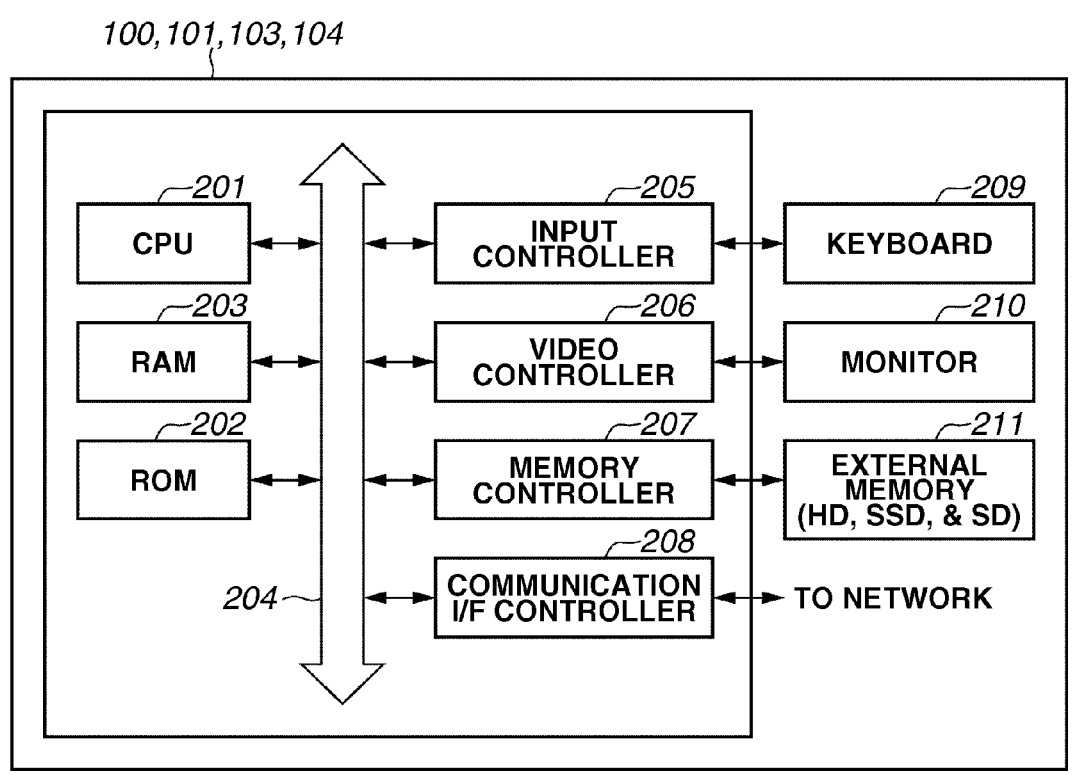
FIG. 2 is a block diagram illustrating the hardware configuration of the information processing apparatus applicable to a personal computer (PC), a print server, a login service PC, and a directory service server illustrated in FIG. 1.

FIG. 2 is a block diagram illustrating the hardware configuration of the information processing apparatus applicable to the PC 100, the print server 101, the login service PC 103, and the directory service server 104 illustrated in FIG. 1.

In FIG. 2, a central processing unit (CPU) 201 totally controls the devices and controllers connected to a system bus 204. A read only memory (ROM) 202 and an external memory 211 store basic input/output system (BIOS) and operating system (hereinafter referred to OS) programs being the control program of the CPU 201 and various types of programs described below and required for realizing functions executed by each server or PC.

A random access memory (RAM) 203 functions as a main memory and a work memory for the CPU 201. The CPU 201 loads programs required for executing processing in the RAM 203 from the ROM 202 or the external memory 211 to realize various operations by executing the loaded programs.

An input controller 205 controls input from a keyboard 209 or a pointing device such as a mouse (not illustrated). A video controller 206 controls display on a monitor 210. In general, the monitor 210 refers to a display such as a liquid crystal or a cathode ray tube (CRT) display. Those are used by an administrator if required.

A memory controller 207 controls access to the external memory 211 such as a hard disk (HD), a solid state drive (SSD), and a secure digital (SD) memory card, which store a boot program, various types of applications, font data, user files, editing files, and various data.

A communication interface (I/F) controller 208 is communicatively connected with an external device via a network (for example, the LAN 105 illustrated in FIG. 1) and executes communication control processing over the network. For example, the communication I/F controller 208 can perform communication using the Transmission Control Protocol/Internet Protocol (TCP/IP).

The CPU 201 rasterizes an outline font to an information display area of the RAM 203, for example, to allow display on a monitor 210. The CPU 201 allows the user instructions with a mouse cursor (not illustrated) on the monitor 210.

Various types of programs described below and used for realizing embodiments are stored in the external memory 211, loaded in the TRAM 203 if required, and executed by the CPU 201. A definition file and various types of information files used for executing the above programs are also stored in the external memory 211. Those are described in detail below.

A hardware configuration of a controller unit for controlling the image forming apparatus 102 illustrated in FIG. 1 is describe below with reference to FIG. 3.

Figure 3:
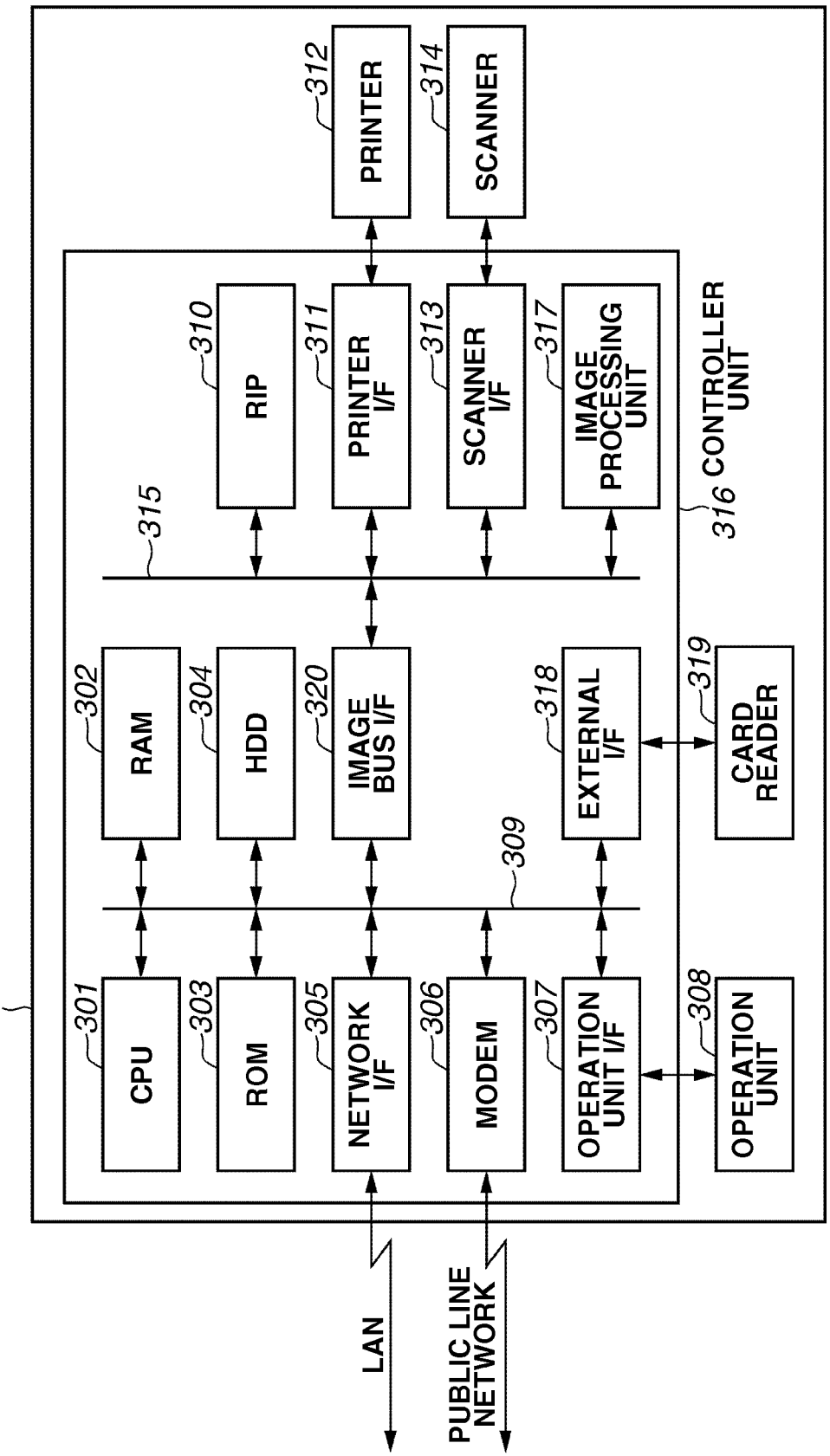
FIG. 3 is a block diagram illustrating an example of a hardware configuration of the controller unit of the image forming apparatus illustrated in FIG. 1.

FIG. 3 is a block diagram illustrating an example of a hardware configuration of the controller unit of the image forming apparatus 102 illustrated in FIG. 1.

In FIG. 3, a controller unit 316 is connected with a scanner unit 314 functioning as an image input apparatus and a printer unit 312 functioning as an image output apparatus and with a local area network (for example, the LAN 105 illustrated in FIG. 1) and a public line (WAN) (for example, public switched telephone network (PSTN) or integrated services digital network (ISDN)) to input and output image data and device information.

In the controller unit 316, a CPU 301 is a processor for controlling the entire system. A RAM 302 is a system work memory for operating the CPU 301, a program memory for storing programs, and also an image memory for temporarily storing image data.

A ROM 303 stores a boot program for the system and various types of control programs. A hard disk drive (HDD) 304 stores various types of programs for controlling the system and image data. The controller unit 316 may include other storage apparatuses such as the SSD instead of the HDD 304.

An operation unit interface (operation unit I/F) 307 is an interface unit with an operation unit (user interface (UI)) 308 and outputs image data to be displayed on the operation unit 308 to the operation unit 308. The operation unit I/F 307 plays the role to transfer information (user information, for example) which the user of the system acquires from the operation unit 308 to the CPU 301. The operation unit 308 is equipped with a display unit with a touch panel. The user presses a button displayed on the display unit (or touches the button with a finger) to allow execution of various instructions.

A network interface (network interface I/F) 305 is connected with the network (LAN) to input and output data. A modulator demodulator (MODEM) 306 is connected with a public line to input and output data for transmitting and receiving facsimile (FAX).

An external interface (external I/F) 318 is an I/F unit for receiving external inputs such as universal serial bus (USB), Institute of Electrical and Electronics Engineers (IEEE) 1394, printer port, and Recommended Standard (RS)-232C. The external I/F 318 is connected with a card reader 319 for reading an IC card needed for authentication in the present exemplary embodiment. The CPU 301 controls the card reader 319 reading information from the IC card via the external I/F 318 and can acquire the information read from the IC card. The abovementioned devices are arranged on a system bus 309.

An image bus interface (image bus I/F) 320 is a bus bridge which connects the system bus 309 with an image bus 315 which transfers image data at high speed and converts data structure.

The image bus 315 includes a peripheral component interconnect (PCI) bus and Institute of Electrical and Electronics Engineers (IEEE) 1394. The following devices are arranged on the image bus 315.

A raster image processor (RIP) 310 rasterizes vector data such as PDL code, for example, into a bitmap image. A printer interface (printer I/F) 311 connects the printer unit 312 with the controller unit 316 and performs synchronous/asynchronous conversion of the image data. A scanner interface (scanner I/F) 313 connects the scanner unit 314 with the controller unit 316 and performs synchronous/asynchronous conversion of the image data.

An image processing unit 317 subjects input image data to correction, processing, and editing and performs correction and resolution conversion of the printer for print output image data. In addition to that, the image processing unit 317 rotates image data and subjects multivalued image data to a Joint Photographic Experts Group (JPEG) compression and decompression processing and binary image data to a Joint Bi-level Image Experts Group (JBIG), a Modified Modified READ (MMR), or a Modified Huffman (MH) compression and decompression processing.

The scanner unit 314 illuminates an image on a document of paper and scans the document by a CCD line sensor to convert the image into an electric signal being raster image data. The user of the apparatus puts document sheets in a tray of a document feeder of the scanner unit 314 and gives instructions for starting to read the document via the operation unit 308, so that the CPU 301 issues instructions to the scanner unit 314. The scanner unit 314 feeds the document sheets one by one from the feeder and reads an image on the document.

The printer unit 312 converts the raster image data into an image on a sheet. A printing method includes an electrophotographic method using a photosensitive drum and a photosensitive belt and an inkjet method in which ink is ejected from a fine nozzle array to directly print an image on the sheet. The printer unit 312 may use any of the printing methods. The operation of the printer unit 312 is started by instructions from the CPU 301. The printer unit 312 has a plurality of paper feeding stages by which the user can select different paper sizes and different paper orientations and a paper cassette corresponding thereto.

The operation unit 308 includes an LCD display unit on which a touch panel sheet is stuck, displays the operation screen of the system, and transfers information about a position where a displayed key is pressed to the CPU 301 via the operation unit I/F 307.

The operation unit 308 includes a start key, a stop key, an ID key, and a reset key, for example, as various operation keys. The start key of the operation unit 308 is used for starting an operation for reading a document image. A green and a red LED are arranged on the center portion of the start key and indicate whether the start key can be used depending on their colors. The stop key of the operation unit 308 functions to stop the operation which is being executed. The ID key of the operation unit 308 is used for inputting the ID of the user. The reset key is used for initializing the setting from the operation unit.

The card reader 319 reads information stored in an IC card (for example, FeliCa (registered trademark) of Sony Corp.) in accordance with the control of the CPU 301 and notifies the CPU 301 of the read information via the external I/F 318.

The above configuration allows the image forming apparatus 102 to transmit the image data read via the scanner 314 to the LAN 105 and cause the printer unit 312 to print and output the print data received from the LAN 105. The image data read via the scanner 314 can be transmitted to a public line by facsimile via the modem 306 and the image data received by facsimile from the public line can be output by the printer unit 312.

A general flow for displaying information in detail in the print system according to the present exemplary embodiment is described below with reference to FIG. 4.

A premise for executing the pull printing according to the present exemplary embodiment is described first. A virtual printer driver for realizing the pull printing according to the present exemplary embodiment is installed in the print server 101 as a shared printer. The printer driver has a function not only to generate print data based on the output of print and rendering command directed by the application but also to store a function (user interface) to perform print setting for controlling the functions of the printer driver and the printer and the print setting for each installed logical printer. The print setting is stored in the DEVMODE structure (hereinafter referred to as DEVMODE) for the case of Windows (registered trademark) of Microsoft Corporation. The DEVMODE is a regulation made by Microsoft Corporation in the U.S. to store various settings including the operation condition of default related to the logical printer such as a printer usable function, layout setting, finish setting, paper feed and discharge setting, and print quality setting in the external memory for each installed printer. The virtual printer driver is downloaded to each client PC 100 from the print server 101 using the Point and Print function and installed therein and the logical printer of the virtual printer driver is added thereto.

A general flow of pull printing of the present exemplary embodiment is described below.

Figure 4:
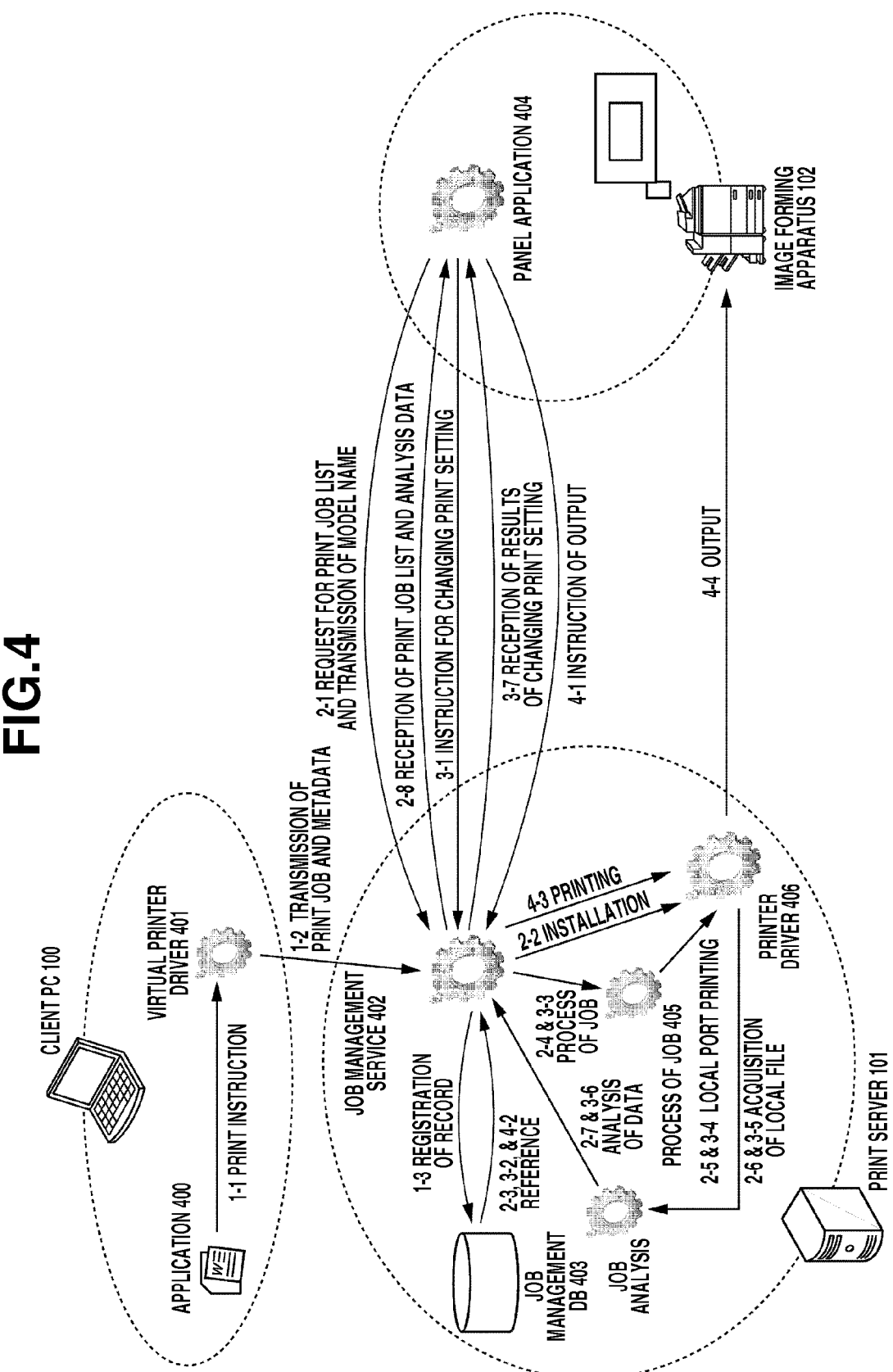
FIG. 4 is a schematic diagram illustrating a general flow of the printing system according to the exemplary embodiment.

FIG. 4 is a schematic diagram illustrating a general flow of the printing system according to the present exemplary embodiment.

As illustrated in FIG. 4, the user logs in the client PC 100 and gives a print instruction to the logical printer corresponding to a virtual printer driver 401 from a client application 400 executed in the client PC 100 (1-1). The client application 400 of the client PC 100 transmits data to the virtual printer driver 401 in accordance with the print instruction via a graphic engine.

The virtual printer driver 401 of the client PC 100 generates the EMFSPOOL-format print job independent of the image processing apparatus based on the data received from the client application 400 via the graphic engine. The virtual printer driver 401 also generates metadata including the print setting (DEVMODE) of the virtual printer driver 401 and user information of the client PC 100. The client PC 100 transmits the generated EMFSPOOL-format print job and the metadata including the print setting information to the print server 101 (1-2).

A job management service 402 of the print server 101 receives the EMFSPOOL-format print job and the metadata from the client PC 100. The job management service 402 of the print server 101 stores the EMFSPOOL-format print job in a predetermined storage location in the print server 101 and registers the file names of the metadata and the EMFSPOOL-format print job in a job management DB 403 (established on the external memory of the print server 101) (1-3). At this point, the print server 101 stores the print job in the predetermined storage location but does not transmit the print job to the image processing apparatus.

When the image forming apparatus 102 detects the IC card, which can be read by the card reader 319, the image forming apparatus 102 reads personal authentication information in the IC card and transmits the read personal authentication information as a request for authentication to an authentication server (not illustrated). The personal authentication information is the one that is used for authentication and may use a serial number of the IC card. When the authentication server receives personal authentication information from the image forming apparatus 102, the authentication server performs the authentication processing of the personal authentication information on the basis of an IC card authentication table stored in an external memory of the authentication server and transmits authentication results to the image forming apparatus 102. If the authentication server succeeds in the authentication processing, the authentication server transmits the user identifier of the client PC 100 thereto.

A panel application 404 of the image forming apparatus 102 receives authentication results (or the login identifier of the client PC 100) in which the authentication server succeeds in the authentication processing. In the present exemplary embodiment, a user name is used as a user identifier. A serial number of the IC card may be used as a unit for identifying a user. The panel application 404 requests the job management service 402 of the print server 101 to send a print job list and transmits the model name and the user name of the image forming apparatus 102 (2-1).

The job management service 402 installs the printer driver 406 suited for the model using the model name transmitted from the panel application 404 (2-2). The job management service 402 refers to the targeted metadata and EMFSPOOL-format print job in the job management DB 403 using the user identifier transmitted from the panel application 404 (2-3) to process the rendering data of the EMFSPOOL-format print job (2-4). The process of rendering data refers to processing for deleting a graphical device interface (GDI) command of the EMFSPOOL-format print job for each logical page and adding any GDI command. The process of rendering data is described below.

The job management service 402 transmits the processed EMFSPOOL-format print job and the referenced metadata to the printer driver 406 to perform a local port printing (2-5). The local port printing refers to storage (output) of the PDL data generated by the printer driver 406 in a file format in the storage area of the apparatus. The job management service 402 acquires the stored PDL data (output data of the local port printing) (2-6) to analyze the PDL data and starts to generate a print job list corresponding to the user identifier (2-7).

The job management service 402 repeats the processes 2-3 to 2-7 until the job management service 402 finishes referring to the print job corresponding to the user identifier in all the records in the job management DB 403 to generate a print job list. As soon as the job management service 402 completes the generation of the print job list, the job management service 402 transmits the print job list to the panel application 404 (2-8).

The panel application 404 receives the print job list from the job management service 402 and displays the print job list on the UI of the operation unit 308. When the user selects a print job and changes the print setting, the panel application 404 transmits information about the change of the print setting to the job management service 402 (3-1).

When the job management service 402 receives the information about the change of the print setting from the panel application 404, the job management service 402 refers to the targeted metadata and EMFSPOOL-format print job in the job management DB 403 (3-2) to update the metadata based on the information about the change of the print setting.

The job management service 402 processes the rendering data of the EMFSPOOL-format print job (3-3).

The job management service 402 transmits the processed EMFSPOOL-format print job and the updated metadata to the printer driver 406 to perform the local port printing, and stores (outputs) the PDL data in the file format in the storage area in the apparatus (3-4). The job management service 402 acquires the stored PDL data (output data of the local port printing) (3-5) to analyze the PDL data (3-6) and transmits the print setting change result of the print job to the panel application 404 (3-7).

The panel application 404 receives the print setting change result from the job management service 402 and displays the print setting change result on the UI of the operation unit 308. When the user selects a print job and gives a print instruction in the panel application 404, the job management service 402 receives an output instruction (4-1) and refers to the targeted job in the job management DB (4-2).

The job management service 402 prints the metadata and the EMFSPOOL-format print job in the job management DB 403 by the logical printer whose output port is set in the address of the image forming apparatus 102 (4-3) and causes the image forming apparatus 102 to output the print (4-4).

A general flow of the printing system is described above. The flow of the printing system is described below with reference to a flow chart. The client application 400 and the virtual printer driver 401 are realized by the CPU of the client PC 100 executing the program computer-readably stored in the external memory. The job management service 402 and the printer driver 406 are realized by the CPU of the print server 101 executing the program computer-readably stored in the external memory. The panel application 404 of the image forming apparatus 102 is realized by the CPU 301 of the image forming apparatus 102 executing the program computer-readably stored in the HDD 304.

The print instruction on the client application 400 operating on the client PC 100 illustrated in FIG. 1 is described with reference to FIG. 5.

Figure 5:
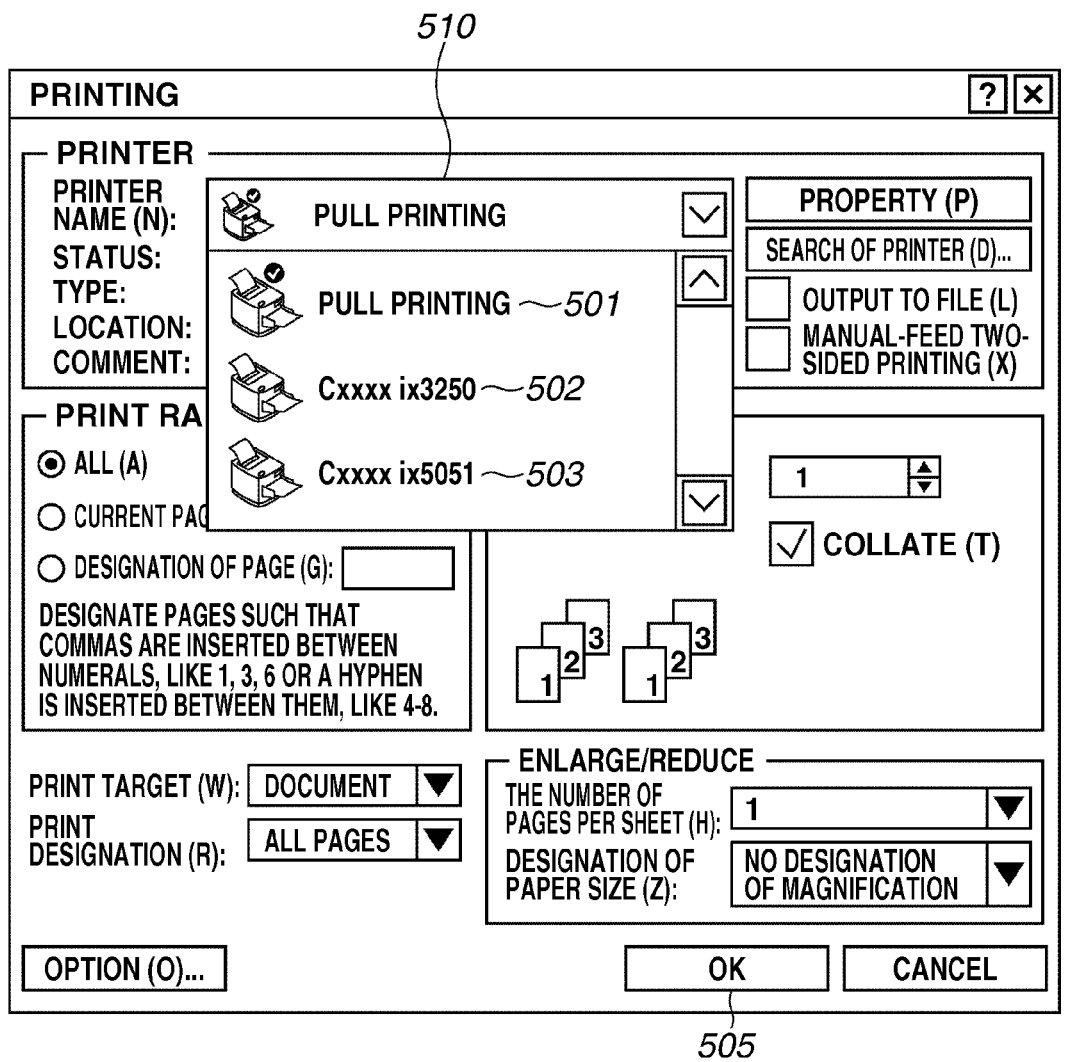
FIG. 5 is a schematic diagram illustrating an example of the print screen of a client application operating on the client PC illustrated in FIG. 1.

FIG. 5 is a schematic diagram illustrating an example of the print screen of the client application 400 operating on the client PC 100 illustrated in FIG. 1. The print screen is displayed on the monitor of the client PC 100 under the control of the CPU of the client PC 100.

In FIG. 5, a logical printer selection field 510 can be used to select a logical printer for printing from the logical printers set in the client PC 100. A "pull printing" 501 in the logical printer selection field 510 is taken as a logical printer corresponding to the virtual printer driver 401 in FIG. 4 in which the pull printing is set according to the present exemplary embodiment. "Cxxxx ix 3250" 502 and "Cxxxx ix 5051" 503 are taken as logical printers corresponding to normal printer drivers.

When any logical printer is selected in the logical printer selection field 510 and an OK button 505 is designated by a pointing device, the client application 400 transmits print data to the printer driver corresponding to the logical printer selected by the logical printer selection field 510 via a graphic engine.

The operation of the printer driver in a case where the "pull printing" 501 is selected in the logical printer selection field 510 and a print instruction is issued is described with reference to FIG. 6.

Figure 6:
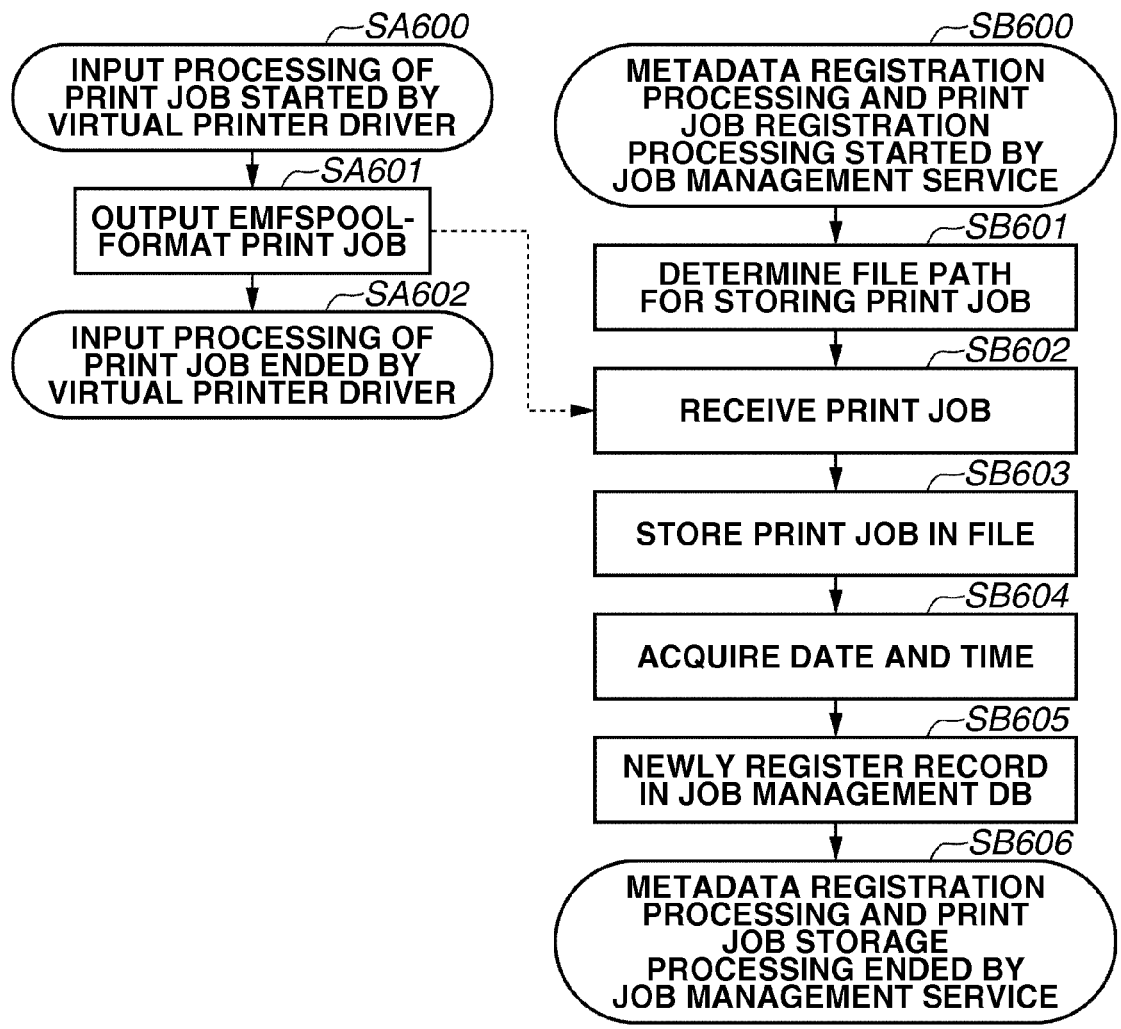
FIG. 6 is a flow chart illustrating an example of a first control process in the printing system according to the exemplary embodiment.

FIG. 6 is a flow chart illustrating an example of a first control process in the printing system according to the present exemplary embodiment. The flow chart corresponds to the processes 1-1 to 1-3 illustrated in FIG. 4. Steps SA600 to SA602 correspond to the print job input process of the virtual printer driver 401 illustrated in FIG. 4. In other words, those steps are realized by the CPU of the client PC 100 in FIG. 1 loading the program stored in the external memory onto the RAM and executing the program. Steps SB600 to SB606 correspond to the registration process of the EMFSPOOL-format print job and the metadata and the storage process of the EMFSPOOL-format print job by the job management service 402 illustrated in FIG. 4. In other words, those steps are realized by the CPU of the print server 101 illustrated in FIG. 1 loading the program stored in the external memory onto the RAM and executing the program.

The print job input process of the virtual printer driver 401A is described below.

In step SA600, the virtual printer driver 401 starts processing. In step SA601, the virtual printer driver 401 outputs the data input from the client application 400 to the virtual printer driver 401 as the EMFSPOOL-format print job. This process corresponds to the process 1-1 in FIG. 4. For the case of Windows (registered trademark) of Microsoft Corporation in the U.S., the data are input to the virtual printer driver 401 by the function call of an operating system (OS) called a device driver interface (DDI). The virtual printer driver 401 interprets the parameter delivered at the same time as the call of the DDI to generate the EMFSPOOL-format print job and outputs the generated job to the spooler managed by the OS. In general, the role of a printer driver is to generate and output the print job to be output dependent on an image forming apparatus, in the present exemplary embodiment, however, it is important to generate and output an intermediate-format print job independent of the image forming apparatus 102. Thereby, the configuration of the virtual printer driver 401 is not changed in the printing system according to the present exemplary embodiment even if the configuration of the image forming apparatus 102 is changed. In other words, it can be easily realized to use the function peculiar to the image forming apparatus 102 with the pull printing system. Furthermore, the virtual printer driver 401 transmits metadata including print setting information. In the present exemplary embodiment, the virtual printer driver 401 transmits the metadata added to the EMFSPOOL-format print job to the job management service 402. However, the virtual printer driver 401 may transmit the metadata divided as other data.

The metadata are described in detail below.

The metadata include data groups with the print setting information. More specifically, the metadata include the DEVMODE, multiple-up information, and pieces of information such as the number of logical pages, physical pages, results of determining whether print data contain a monochrome or a color, and the user name, domain name, and computer name of the client PC 101. For this reason, the job management service 402 can acquire information about a client by receiving information about the metadata. The derivation of all the above metadata needs to implement a method for deriving internal implementation of each printer driver on the job management service 402 or the panel application 404 because the concept of a sheet or page is different in each PDL and model. This is not realistic because implementation is large in burden. For this reason, the present exemplary embodiment proposes a method for updating the metadata using the analysis data acquired via the virtual printer driver 401 and the printer driver 406 to solve that problem. In step SA602, the virtual printer driver 401 finishes processing.

The registration process of the metadata and the storage process of the print job performed by the job management service 402 are described below. In step SB600, the job management service 402 starts processing on the print server 101. In step SB601, the job management service 402 determines a file path for storing the print job therein. In the present exemplary embodiment, the job management service 402 generates a global unique identifier (GUID) to use the GUID as the job identifier of the received print job. The GUID as the job identifier may be used for determining the file path for storing the received print job.

In step SB602, the job management service 402 receives the metadata and the EMFSPOOL-format print job transmitted from the virtual printer driver 401.

In step SB603, the job management service 402 stores the received EMFSPOOL-format print job with the file name determined in step SB601.

In step SB604, the job management service 402 generates the current date and time. These are taken as the time when the print job is input.

In step SB605, the job management service 402 registers the file name determined in step SB601, the metadata, and the data and time generated in step SB604 in the job management DB 403 in FIG. 4 as a new record.

In step SB606, the job management service 402 finishes processing.

Figure 7:
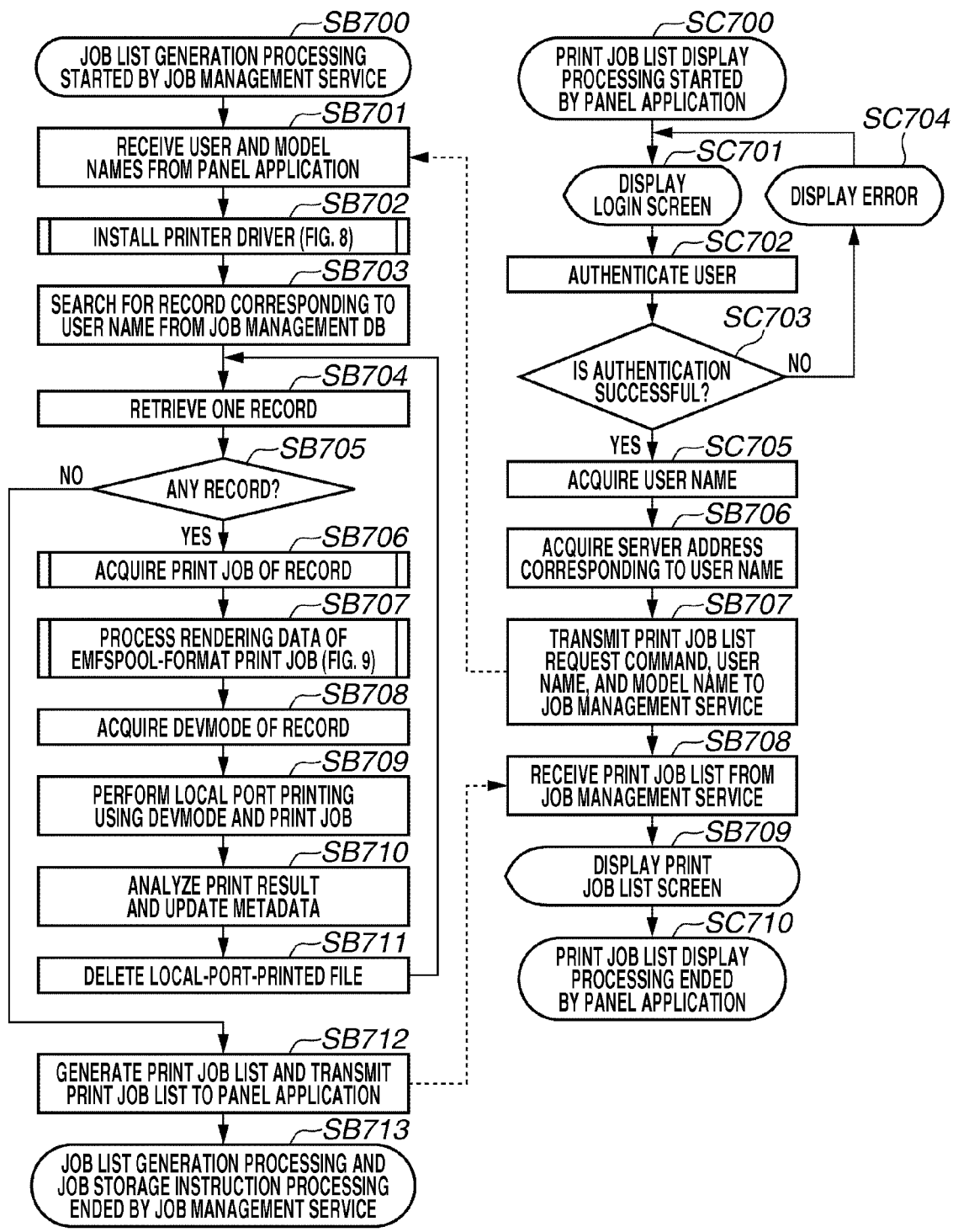
FIG. 7 is a flow chart illustrating an example of a second control process in the printing system according to the exemplary embodiment.

FIG. 7 is a flow chart illustrating an example of a second control process in the printing system of the present exemplary embodiment. The flow chart corresponds to the processes 2-1 to 2-8 illustrated in FIG. 4. Steps SC700 to SC710 correspond to the print job list display process of the panel application 404 illustrated in FIG. 4. In other words, those steps are realized by the CPU 301 of the image forming apparatus 102 illustrated in FIG. 1 loading the program stored in the ROM 303 or the HDD 304 onto the RAM 302 and executing the program.

Steps SB700 to SB713 correspond to the job process and analysis and the print job list generation performed by the job management service 402 illustrated in FIG. 4. In other words, those steps are realized by the CPU of the print server 101 illustrated in FIG. 1 loading the program stored in the external memory onto the RAM and executing the program.

The print job list display process of the panel application 404 is described below.

In step SC700, the panel application 404 starts processing. In step SC701, the panel application 404 performs control to display a login display screen (in FIG. 13A) on the display unit of the operation unit 308.

Figure 13A:
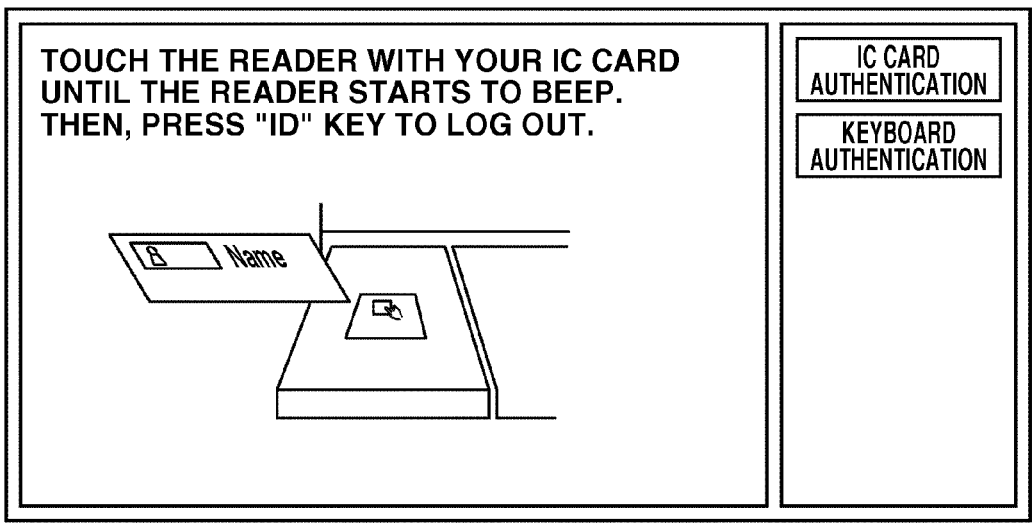
FIGS. 13A and 13B illustrate examples of screens displayed on the operation unit of the image forming apparatus.

FIG. 13A is a schematic diagram illustrating an example of the login display screen displayed on the operation unit 308 of the image forming apparatus 102.

In step SC702, the panel application 404 performs user authentication using an IC card. In the present exemplary embodiment, the user authentication is not an important process, so that the detailed description of a method for detecting an authentication card, a method for acquiring the identification (ID) of the IC card, and the authentication process of the authentication server is omitted herein.

In step SC703, the panel application 404 determines authentication results. If the acquired authentication result is an authentication error (NO in step SC703), then in step SC704, the panel application 404 performs control to display an error display screen (in FIG. 13B) on the display unit of the operation unit 308.

Figure 13B:
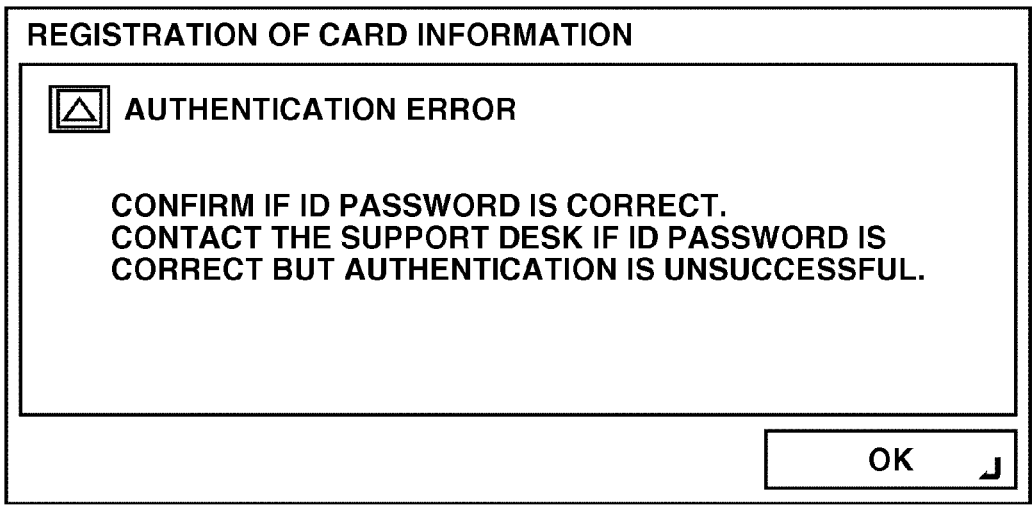

FIG. 13B is a schematic diagram illustrating an example of the error display screen displayed on the operation unit 308 of the image forming apparatus 102.

When the OK button is pressed in the error display screen, the panel application 404 returns the processing to step SC701 and performs the display control of the login display screen again.

If it is determined that authentication is successful (YES in step SC703), the panel application 404 advances the processing to step SC705.

In step SC705, the panel application 404 acquires the user name that succeeds in authentication.

In step SC706, the panel application 404 acquires the user name and the IP address of the server corresponding thereto.

In the present exemplary embodiment, the address resolution method of the print server for each user is not an important process, so that the print server used by each user is regarded as being uniquely determined and the detailed description thereof is omitted herein. The address resolution is realized by referring to the DB in which the correspondence of the user name to the target print server address is registered after user authentication. Alternatively, another method may be used in which a table of the correspondence of the user name to the target print server address is stored in the HDD 304 of the image forming apparatus and the address of the print server used by the user is acquired from the correspondence table after user authentication.

In step SC707, the panel application 404 transmits a print job list request command to the job management service 402. At this point, the panel application 404 also transmits the user name and the model name of the image forming apparatus 102.

In step SC708, the panel application 404 receives a print job list from the job management service 402. The print job list includes information about items such as a GUID, a job name, the number of copies, two-sided printing, a color mode, multiple-up, date and time, the number of pages, the number of color pages, and the number of monochrome pages for each job. In the present exemplary embodiment, these print job list data use a data format such as the XML format which can be easily extended. The items used in the print job list are described above. However, the items may be increased or decreased in number if needed.

In step SC709, the panel application 404 performs control to display a print job list display screen (in FIG. 14A) on the display unit of the operation unit 308.

FIG. 14A is a schematic diagram illustrating an example of the print job list display screen displayed on the operation unit 308 of the image forming apparatus 102.

The panel application 404 displays the print job list display screen in FIG. 14A and finishes processing in step SC710.

The job process and analysis and the print job list generation performed by the job management service 402 are described below. In step SB700, the job management service 402 start processing. In step SB701, the job management service 402 receives a request for a print job list from the panel application 404. At this point, the job management service 402 also receives a user name and the model name of the image forming apparatus 102. The request for a print job list and others are the same ones as those transmitted in step SC707.

In step SB702, the job management service 402 installs a printer driver suited for the model name of the image forming apparatus 102 received in step SB701. This processing is described in detail below in FIG. 8.

In step SB703, the job management service 402 searches for a record corresponding to the user name acquired in step SB701 from the job management DB 403 in FIG. 4.

In step SB704, the job management service 402 retrieves one record out of the records for which the job management service 402 searches in step SB703.

In step SB705, the job management service 402 determines whether the record can be retrieved in step SB704. If the job management service 402 determines that the record can be retrieved (YES in step SB705), the job management service 402 advances the processing to step SB706.

In step SB706, the job management service 402 acquires the EMFSPOOL-format print job using the information about the record (the current record) retrieved in step SB704.

In step SB707, the job management service 402 processes the EMFSPOOL-format print job. This processing is described in detail below in FIG. 9.

In step SB708, the job management service 402 acquires the DEVMODE of metadata from the current record.

In step SB709, the job management service 402 performs the local port printing using the print job processed in step SB707 and the DEVMODE acquired in step SB708 by using the printer driver 406. At this point, the printer driver 406 uses the logical printer which is generated in step SB707 and whose output port is set in the local port. More specifically, in step SB709, the job management service 402 generates PDL data for recognizing output settings to be actually printed by the image forming apparatus 102 on the print server 101 from the processed print job and the print setting information by using the printer driver 406 and outputs the PDL data to a local storage area of the print server 101.

In step SB710, the job management service 402 analyzes the PDL data stored as a file by the local port printing in step SB709 to acquire format information (information about output settings to be actually printed by the image forming apparatus 102) from the PDL data and updates the metadata. The updated metadata are stored in the RAM and used for the generation of the print job list described below.

In step SB711, the job management service 402 deletes the PDL data generated in step SB707, returns the processing to step SB704, and retrieves the next record.

If the job management service 402 determines that the record cannot be retrieved (NO in step SB705), the job management service 402 determines that all the records are finished to be retrieved, and advances the processing to step SB712.

In step SB712, the job management service 402 generates the print job list (in FIG. 14A) using the metadata updated in steps SB704 to SB711 and transmits the print job list to the panel application 404. The print job list includes information about the output settings of each print job and is received by the panel application 404 of the image forming apparatus 102 in step SC708. The job management service 402 finishes processing in step SB713.

Figure 8:
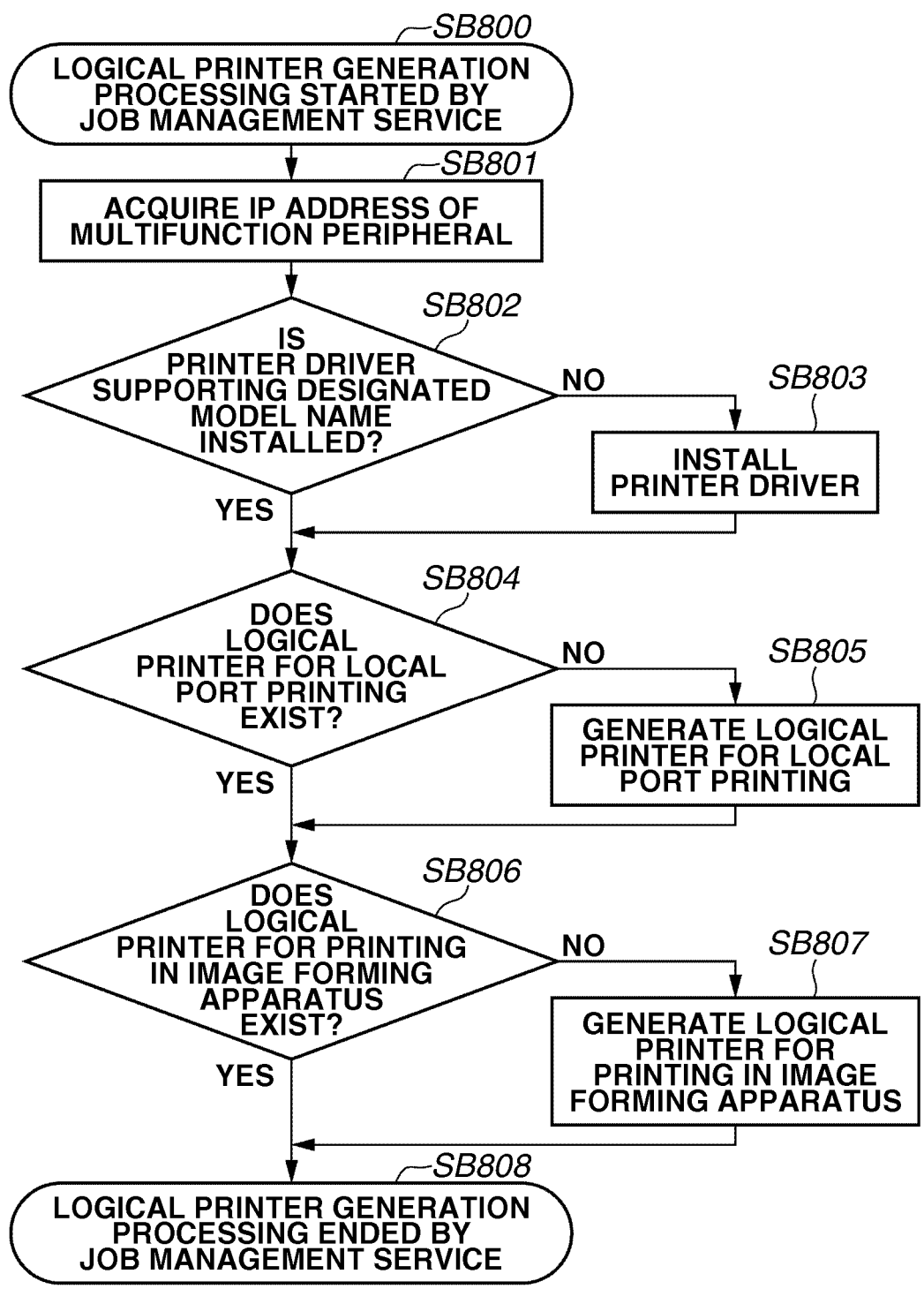
FIG. 8 is a flow chart of a logical printer generation processing called in step SB702 in FIG. 7.

FIG. 8 is a flow chart of a logical printer generation processing called in step SB702 in FIG. 7. Steps SB800 to SB808 correspond to the logical printer generation processing performed by the job management service 402 illustrated in FIG. 4. In other words, those steps are realized by the CPU of the client PC 100 in FIG. 1 loading the program stored in the external memory onto the RAM and executing the program.

In step SB800, the job management service 402 starts the logical printer generation processing. In step SB801, the job management service 402 acquires the IP address of the image forming apparatus 102 (the image forming apparatus which receives the user and model names in step SB701 in FIG. 7). The IP address of the image forming apparatus 102 is acquired and stored in the RAM by the job management service 402 at the time of stabling the connection between the job management service 402 and the panel application 404 for transmitting and receiving data.

In step SB802, the job management service 402 determines whether the printer driver supporting the model name of the image forming apparatus 102 (received in step SB701 in FIG. 7, for example) is installed in the print server 101. If the job management service 402 determines that the printer driver is not installed (NO in step SB802), the job management service 402 advances the processing to step SB803.

In step SB803, the job management service 402 installs the printer driver supporting the model name of the image forming apparatus 102 in FIG. 1 in the print server 101. The processing proceeds to step SB804.

If the job management service 402 determines that the printer driver is installed (YES in step SB802), the job management service 402 advances the processing to step SB804 as is. The printer driver installed at this stage corresponds to the printer driver 406 in FIG. 4.

In step SB804, the job management service 402 determines whether the logical printer for the local port printing exists in the print server 101. The logical printer for the local port printing is formed of the installed printer driver and refers to the one whose output port is set so as to be a specified file path.

If the job management service 402 determines that the logical printer for the local port printing does not exist (NO in step SB804), the job management service 402 advances the processing to step SB805.

In step SB805, the job management service 402 generates the logical printer in which the output port is set in the specified file path using the installed printer driver. For the filename of the output port, a unique local port monitor is formed, for example, a job stored in a folder for each user may be stored by turns by the local port monitor. Such setting can generate the logical printer for each user instead of generating the logical printer for each job. The file name may be determined using a job identifier such as the GUID or any file name may be used.

When step SB805 is completed, the job management service 402 advances the processing to step SB806.

If the job management service 402 determines that the logical printer for the local port printing exists (YES in step SB804), the job management service 402 advances the processing to step SB806 as is. In step SB806, the job management service 402 determines whether the logical printer for printing in the image forming apparatus exists in the print server 101. The logical printer for printing in the image forming apparatus is formed of the installed printer driver and refers to the one in which the IP address acquired in step SB801 is set in the output port.

If the job management service 402 determines that the logical printer for printing in the image forming apparatus does not exist (NO in step SB806), the job management service 402 advances the processing to step SB807.

In step SB807, the job management service 402 generates the logical printer in which the IP address acquired in step SB801 is set in the output port using the installed printer driver. The job management service 402 advances the processing to step SB808 and ends the processing.

If the job management service 402 determines that the logical printer for printing in the image forming apparatus exists (YES in step SB806), the job management service 402 advances the processing to step SB808 and ends the processing.

Figure 9:
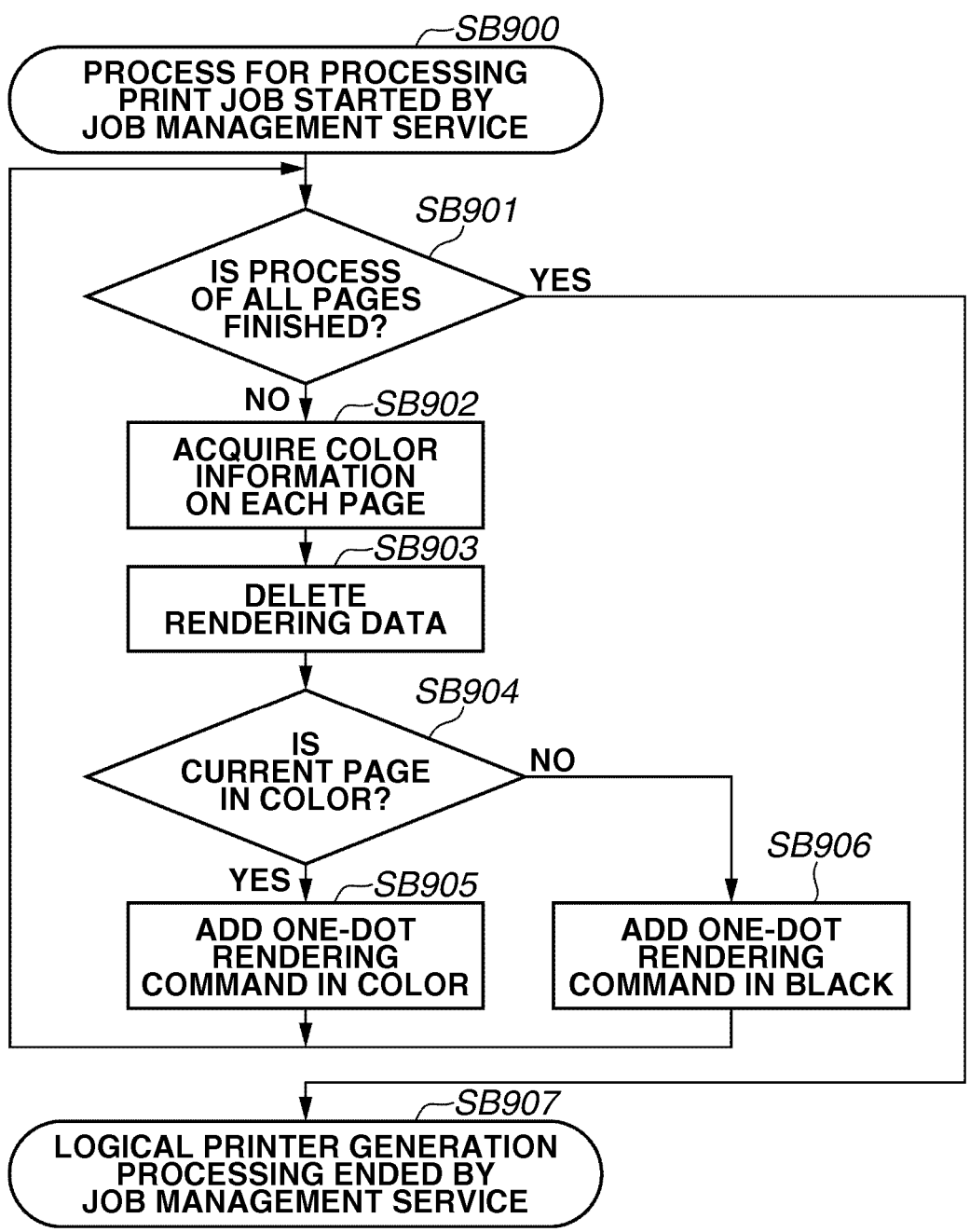
FIG. 9 is a flow chart of the process for processing the EMFSPOOL-format print job called in step SB707 in FIG. 7.

FIG. 9 is a flow chart of the process for processing the EMFSPOOL-format print job called in step SB707 in FIG. 7. Steps SB900 to SB907 correspond to the process for processing the EMFSPOOL-format print job performed by the job management service 402 illustrated in FIG. 4. In other words, those steps are realized by the CPU of the client PC 100 in FIG. 1 loading the program stored in the external memory onto the RAM and executing the program.

In step SB709 in FIG. 7, an original document instructed to be printed is subjected to a local port printing as is to significantly deteriorate performance according to the capacity of print data. A deterioration in the performance of the present process affects the entire system because the local port printing is frequently performed. For this reason, in the present process, the print job of the EMFSPOOL-format print job is processed to improve the performance of the local port printing. Since information required for the present process is print setting information after printing, rendering data do not need to be an original document. However, the data finally used for printing need an original document, so that the local port printing is performed only to acquire the print setting information in the present exemplary embodiment.

The EMFSPOOL-format data are recorded as a series of GDI commands (a graphic application program interface (API) of Windows (registered trademark) of Microsoft Corporation, for example) and the printer driver 406 converts the GDI command into the PDL command. For that reason, at that stage, the EMFSPOOL-format data are not yet subjected to rendering, so that it is easy to add and delete the GDI command. In the present exemplary embodiment, all rendering commands in a page are deleted and a GDI command for adding one dot using color information of page of the original document is inserted therein. Printing is performed by the printer driver 406 using such processed EMFSPOOL-format print job and metadata to generate the PDL data subjected to minimum rendering. The analysis of the PDL data allows acquiring the print setting information of the output product.

The process for processing the EMFSPOOL-format print job is described below with respect to FIG. 9.

In step SB900, the job management service 402 starts the process for processing the EMFSPOOL-format print job. In step SB901, the job management service 402 determines whether the process of all pages is finished. If the job management service 402 determines that the process of all pages is not yet finished (NO in step SB901), the job management service 402 advances the processing to step SB902. All steps SB902 to SB906 are performed in units of pages.

In step SB902, the job management service 402 acquires color information from the current page. As described above, the EMFSPOOL-format data hold the rendering command as is, so that it is easy to acquire color information.

In step SB903, the job management service 402 deletes rendering data in units of pages. In other words, all the rendering data in the current page are deleted.

In step SB904, the job management service 402 determines whether the current page is in color or monochrome based on the information acquired in step SB902. In this determination process, if the page includes a command for performing rendering in color (or colors excluding black), the job management service 402 determines that the page is in color. If the page does not include a command for performing rendering in color (or colors excluding black), the job management service 402 determines that the page is in monochrome.

If the job management service 402 determines that the current page is in color (YES in step SB904), the job management service 402 advances the processing to step SB905 and adds a rendering command for performing one-dot rendering in any color except black to the current page.

If the job management service 402 determines that the current page is in monochrome (not in color) (NO in step SB904), the job management service 402 advances the processing to step SB906 and adds a rendering command for performing one-dot rendering in black to the current page.

When the job management service 402 completes the process of steps SB905 or SB906, the job management service 402 returns the processing to step SB901 and performs the process on the next page.

If the job management service 402 determines that the process of all pages is finished (YES in step SB901), the job management service 402 advances the processing to step SB907 and ends the process for processing the EMFSPOOL-format print job.

The following description is made with reference to a specific example illustrated in FIG. 10.

FIG. 10 is a schematic diagram illustrating an example of the process for processing the intermediate-format print job in the printing system according to the present exemplary embodiment.

A case is described in which an original document 1001 (with three pages in monochrome and one page in color) illustrated in FIG. 10, for example, is processed. The original document 1001 is set in a print setting 1010 in FIG. 10 and the printer driver 401 prints the original document 1001 to generate a four-page EMFSPOOL-format print job.

The process for processing the intermediate-format print job is performed to generate the EMFSPOOL-format print job to which one-dot color information acquired from each page is added. The processed EMFSPOOL-format print job is subjected to the local port printing in the print setting 1010a in the setting 1010 illustrated in FIG. 10 to generate PDL data 1003 in FIG. 10. The analysis of the PDL data shows that the setting of multiple-up information 2in1 is applied as indicated in the print setting 1010a in the setting 1010 illustrated in FIG. 10 and the number of pages is two. Furthermore, color information for each page in the PDL data shows that the number of color pages is one and that of monochrome pages is also one, which allows the user to easily acquire the number of color/monochrome pages that the user cannot know before printing. For example, if the page includes a command for performing rendering in color (or colors excluding black), the job management service 402 determines that the page is in color. If the page does not include a command for performing rendering in color (or colors excluding black), the job management service 402 determines that the page is in monochrome and counts the number of color pages and monochrome pages of the PDL data. The job management service 402 performs those processes in step SB710 in FIG. 7. The job management service 402 may calculate the number of sheets to be actually output based on information about two-sided/one-sided document and information in which the PDL data are analyzed.

In the present exemplary embodiment, an added command is taken as one dot, which is the minimum print for improving performance. The command may be a different rendering command or a command extracted from the original document. Furthermore, the position of the added rendering command can be freely set. In the present exemplary embodiment, a PDL is presumed in which rendering is performed on the upper left reference. However, even if a rendering command is added to the upper left corner, the corner is determined as the outside of a print area, so that analysis may not be performed. Then, the rendering command may be processed to a format which can be analyzed by all PDLs or models by setting the rendering command at the center of a sheet. Thus, the process of the intermediate-format print job allows a flexible adaptation.

As described above, the job management service 402 replaces EMFSPOOL-format data for each page with pseudo data (one-dot rendering command) corresponding to color information for each page and performs local printing to generate the PDL data. Thereby, the amount of data processed by the print server is reduced to allow decreasing degradation in the performance of the print server.

Figure 11:
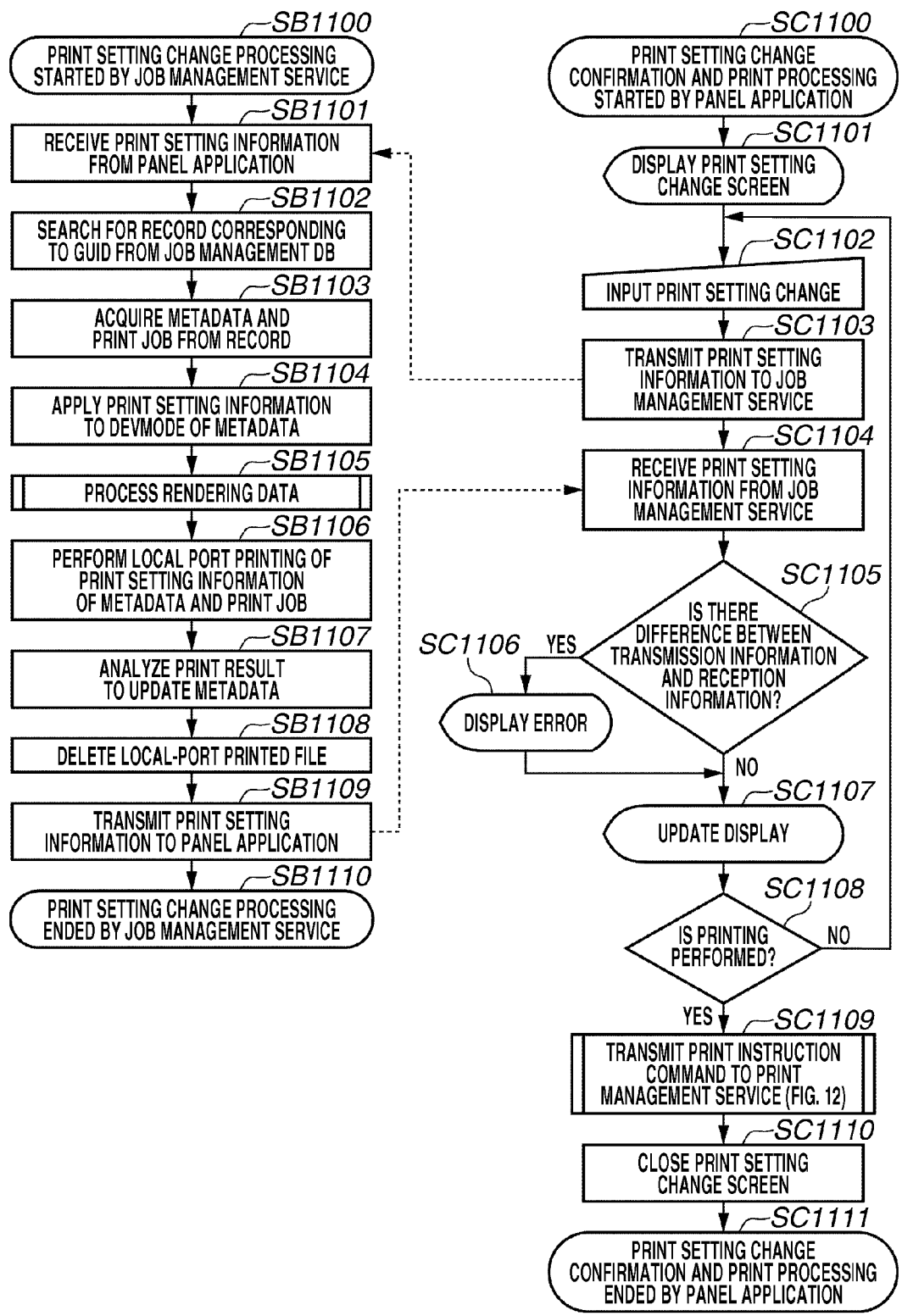
FIG. 11 is a flow chart illustrating an example of a third control process in the printing system according to the exemplary embodiment.

FIG. 11 is a flow chart illustrating an example of a third control process in the printing system according to the present exemplary embodiment. The flow chart corresponds to the processes 3-1 to 3-7 illustrated in FIG. 4. Steps SC1100 to SC1111 correspond to the process of the panel application 404 illustrated in FIG. 4. In other words, those steps are realized by the CPU 301 of the image forming apparatus 102 loading the program stored in the ROM 303 or the HDD 304 onto the RAM 302 and executing the program. Steps SB1100 to SB1110 correspond to the process of the job management service 402 illustrated in FIG. 4. In other words, those steps are realized by the CPU of the print server 101 illustrated in FIG. 1 loading the program stored in the external memory onto the RAM and executing the program.

The change of the print setting performed by the panel application 404 is described below.

In step SC1100, the panel application 404 starts processing when detecting that a print job is selected and a print setting change button 1330 is pressed on the print job list display screen (in FIG. 14A) displayed on the display unit of the operation unit 308 of the image forming apparatus 102 in step SC709 in FIG. 7.

In step SC1101, the panel application 404 performs control to display a print setting change screen (in FIG. 14B) for displaying the print setting of the selected print job on the display unit of the operation unit 308.

In step SC1102, the panel application 404 receives the input of the print setting change from the print setting change screen (FIG. 14B).

FIG. 14B is a diagram illustrating an example of the print setting change screen displayed the operation unit 308 of the image forming apparatus 102.

In FIG. 14B, any one of a monochrome or a color can be designated by checking the designation of a color mode 1340. Any one of one-sided setting, two-sided setting (long-side binding), or two-sided setting (short-side binding) can be selected by checking the designation of one-sided or two-sided setting 1341. Any one of 1in1, 2in1, 4in1, 6in1, 8in1, 9in1, or 16in1 can be selected by checking the designation of multiple-up 1342. Numeric values 1 to 9999 can be designated by the designation of the number of copies 1343.

The total number of pages of prints to be output 1344 cannot be changed but the user can view how the number of pages is changed by changing print setting. The number of color pages 1345 and the number of monochrome pages 1346 indicate the number of color pages and the number of monochrome pages reflecting the print setting, respectively.

The designation of deleting a document after printing 1347 is checked to transmit a command for deleting a document after printing to the job management service 402 along with a print job.

A button 1348 is the one for confirming the change of the print setting after the print setting is changed in the designation fields 1340 to 1343. Pressing the button transmits the print setting information to the job management service 402. A button 1349 is the one for printing.

FIG. 14B illustrates an example in which the print setting is changed by the panel application 404 detecting that a print job of a document name of "financial statement" in FIG. 14A is selected and the print setting change button 1330 is pressed.

The number of sheets required for the image forming apparatus 102 to actually output the job may be displayed on the print setting change screen in FIG. 14B. Alternatively, there may be provided a preview area for displaying an image schematically indicating output settings in which the image forming apparatus 102 actually outputs the job. The preview area displays not an image itself actually output by the job, but a symbol indicating a setting status (or actually output format) such as color mode, two-sided/one-sided, and multiple-up set in the job.

As described above, the panel application 404 changeably displays information about format (information indicating the output settings used for actual printing performed by the image forming apparatus 102) of the print job (selected in FIG. 14A) included in the print job list received from the print server 101 on the print setting change screen (in FIG. 14B).

The flow chart in FIG. 11 is described below.

When the panel application 404 detects that the print setting is changed and the setting change confirmation button 1348 is pressed on the print setting change screen (in FIG. 14B), the panel application 404 advances the processing to step SC1103. Although not illustrated in FIG. 11, if the print start button 1349 is pressed without the setting change confirmation button 1348 being pressed, the panel application 404 advances the processing to step SC1109 as is.

In step SC1103, the panel application 404 transmits the print setting information to the job management service 402. The print setting information includes the GUID being a job identifier of the corresponding print job and may use the abovementioned XML format.

In step SC1104, the panel application 404 receives the print setting information reflecting instructions for the change of the print setting from the job management service 402.

In step SC1105, the panel application 404 compares the print setting information transmitted in step SC1103 with the print setting information received in step SC1104.

For example, the setting information not to be changed in step SC1102 includes a paper size. Assume that the paper size is that of a "post card" at the process 1-1 in FIG. 4. As a prohibition condition, assume that only one-sided printing can be selected in two-sided or one-sided designation for the case of a "post card" as paper. Also assume that the paper size designation is higher than the two-sided or one-sided designation in the priority of the prohibition condition. In that case, the setting of the two-sided or one-sided designation cannot be changed to that of the two-sided designation. If a sophisticated prohibition process similar to that of a printer driver is implemented, the two-sided designation can be prevented from being changed in inputting setting change in FIG. 14B. However, it is very difficult to implement the panel application. As described in the present exemplary embodiment, it is easier and more versatile for the panel application 404 to inquire of the printer driver 406 of the print server 101 whether the print setting can be changed every time the print setting is changed without performing the prohibition process of the print setting.

As a result of comparing the print setting information transmitted in step SC1103 with the print setting information received in step SC1104, if the panel application 404 determines that there is a difference therebetween (YES in step SC1105), the panel application 404 advances the processing to step SC1106.

In step SC1106, the panel application 404 performs control to display an error display screen (in FIG. 15A) on the display unit of the operation unit 308.

Figure 15A:
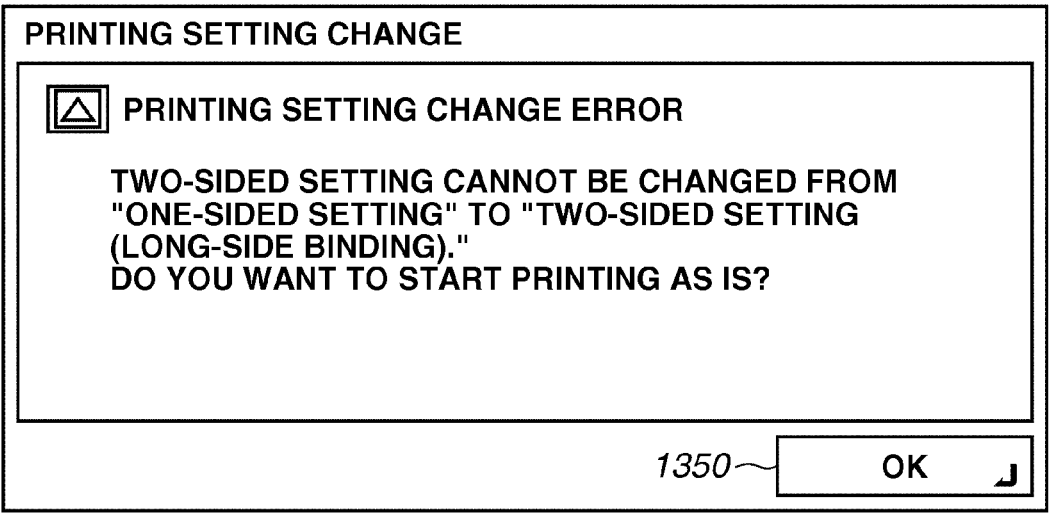
FIGS. 15A and 15B illustrate examples of screens displayed on the operation unit of the image forming apparatus.

FIG. 15A is a chart illustrating an example of the error display screen displayed on the operation unit 308 of the image forming apparatus 102.

If two-sided printing cannot be performed, an error display illustrated in FIG. 15A is performed indicating that "one-sided setting" cannot be changed to "two-sided setting (long-side binding)." When the panel application 404 detects that an OK button 1350 of the error display screen (in FIG. 15A) is pressed, the panel application 404 advances the processing to step SC1107.

If the panel application 404 determines that there is no difference between the print setting information transmitted in step SC1103 and the print setting information received in step SC1104 (NO in step SC1105), the panel application 404 advances the processing to step SC1107 as is.

In step SC1107, the panel application 404 performs control to display the print setting information received in step SC1104 on the print setting change screen (in FIG. 14B). The print setting information displayed thereon is in detail because the analysis result of the local port print file described below is displayed.

In step SC1108, the panel application 404 determines whether printing is executed. If the panel application 404 detects that other buttons except the print start button 1349 are operating on the print setting change screen (in FIG. 14B), the panel application 404 determines that printing is not executed but the input for changing the print setting is performed (NO in step SC1108), and the panel application 404 returns the processing to step SC1102 to receive the input for changing the print setting.

If the panel application 404 detects that the print start button 1349 is operated on the print setting change screen (in FIG. 14B), the panel application 404 determines that printing is executed (YES in step SC1108), the panel application 404 advances the processing to step SC1109.

In step SC1109, the panel application 404 transmits a print instruction command to the job management service 402. The process is described in detail below in FIG. 12.

In step SC1110, the panel application 404 closes the print setting change screen in FIG. 14B. In step SC1111, the panel application 404 ends the processing.

A print setting change processing performed by the job management service 402 is described below.

In step SB1100, the job management service 402 starts processing. In step SB1101, the job management service 402 receives instructions for the change of the print setting from the panel application 404. The instructions for the change of the print setting are transmitted in step SC1103 and include the GUID being a job identifier.

In step SB1102, the job management service 402 searches for the record corresponding to the GUID acquired in step SB1101 from the job management DB 403 in FIG. 4.

In step SB1103, the job management service 402 acquires DEVMODE of metadata and the EMFSPOOL-format print job from the record acquired by search in step SB1102.

In step SB1104, the job management service 402 applies the print setting acquired in step SB1101 to the DEVMODE of metadata acquired in step SB1103. In step SB1105, the job management service 402 processes the rendering data of the EMFSPOOL-format print job. The present process is similar to that in step SB707, so that description thereof is omitted.

In step SB1106, the job management service 402 causes the printer driver 406 to perform the local port printing using the print job processed in step SB1105 and the DEVMODE. The printer driver 406 uses the logical printer which is generated in step SB805 in FIG. 8 and whose output port is a specified file. This processing regenerates PDL data corresponding to the print job which is being processed, outputs the PDL data again to the external memory of the print server 101, and stores them therein as a file.

In step SB1107, the job management service 402 analyzes the PDL data stored as file at the local port printing in step SB1106 to acquire again the print setting information, updating the metadata. The process is similar to that in step SB710 in FIG. 7.

In step SB1108, the job management service 402 deletes the PDL data which are local-port printed in step SB1106.

In step SB1109, the job management service 402 sends back (transmits again) the print setting information acquired in step SB1107 to the panel application 404. In step SB1110, the job management service 402 ends the processing.

Figure 12:
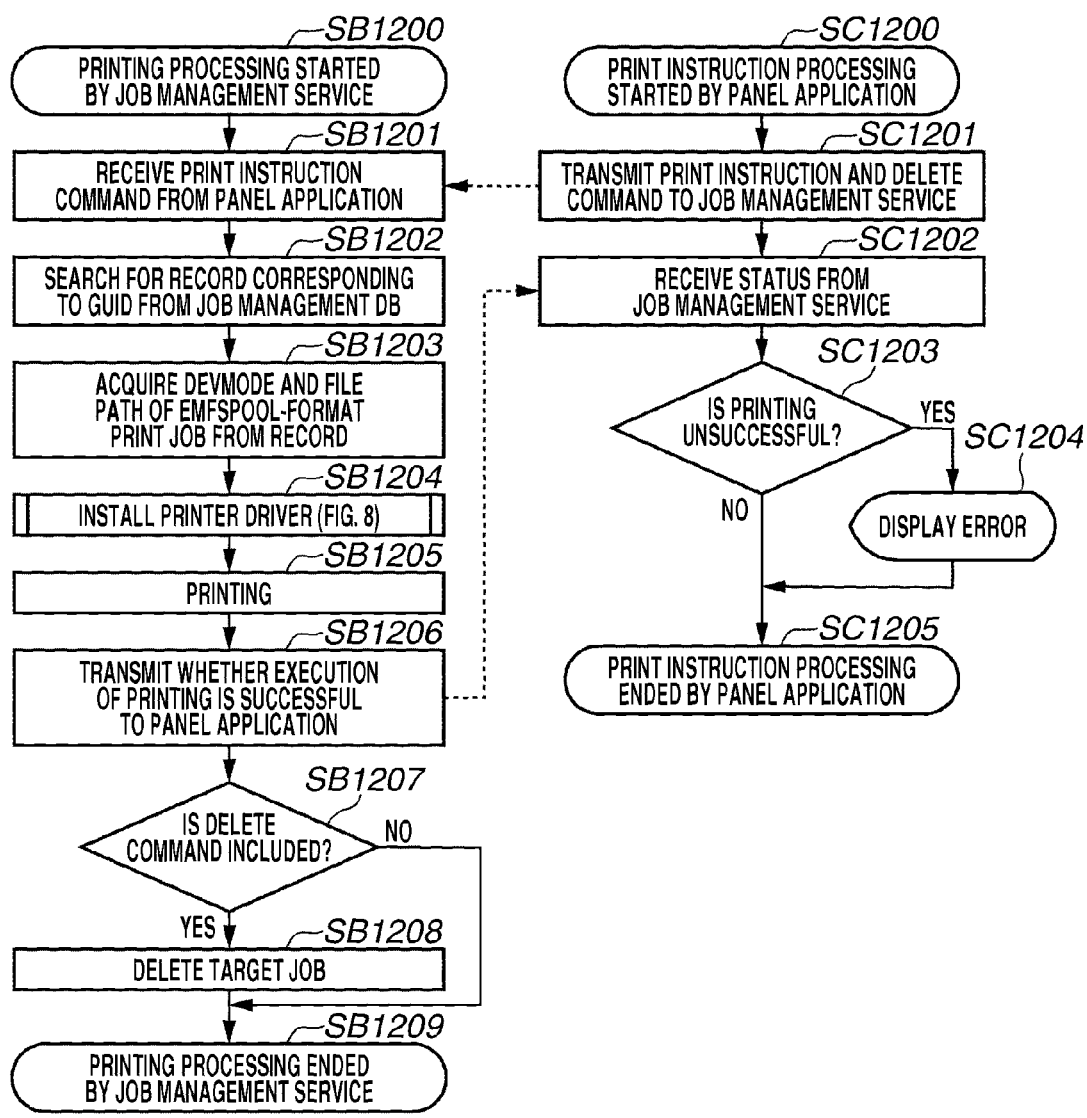
FIG. 12 is a flow chart illustrating an example of a fourth control process in the printing system according to the exemplary embodiment.

FIG. 12 is a flow chart illustrating an example of a fourth control process in the printing system according to the present exemplary embodiment. The flow chart corresponds to the processes 4-1 to 4-4 illustrated in FIG. 4. Steps SC1200 to SC1205 correspond to the print instruction process (in step SC1109 in FIG. 11) performed by the panel application 404 illustrated in FIG. 4. In other words, those steps are realized by the CPU 301 of the image forming apparatus 102 illustrated in FIG. 1 loading the program stored in the ROM 303 or the HDD 304 onto the RAM 302 and executing the program. Steps SB1200 to SB1209 correspond to the print process performed by the job management service 402 illustrated in FIG. 4. In other words, those steps are realized by the CPU of the print server 101 illustrated in FIG. 1 loading the program stored in the external memory onto the RAM and executing the program.

The print instruction process performed by the panel application 404 is described below.

In step SC1200, the panel application 404 starts processing. In step SC1201, the panel application 404 transmits a print instruction request command to the job management service 402. At this point, the panel application 404 also transmits the GUID of the selected print job and the model name of the image forming apparatus 102 to the job management service 402. If the checkbox of "deletion of document after printing" 1347 of the print setting change screen (in FIG. 14B) is checked off, the panel application 404 transmits a command for deletion after printing (delete command) along with the print job.

In step SC1202, the panel application 404 receives the result of execution of printing (whether it is successful) from the job management service 402.

In step SC1203, the panel application 404 determines whether printing is unsuccessful. If the panel application 404 determines that printing is unsuccessful (YES in step SC1203), the panel application 404 advances the processing to step SC1204.

In step SC1204, the panel application 404 performs control to display an error display screen (in FIG. 15B) on the display unit of the operation unit 308.

Figure 15B:
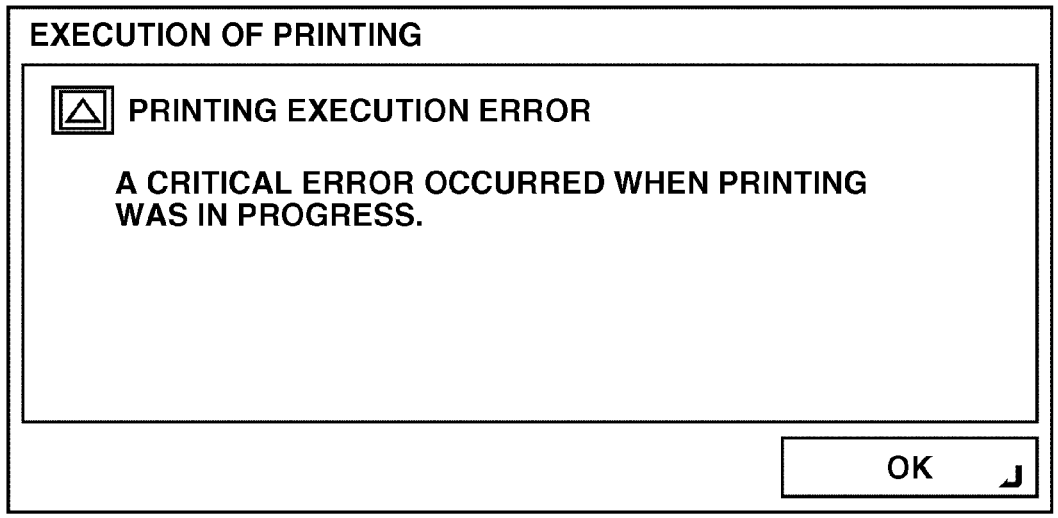

FIG. 15B is a diagram illustrating an example of the error display screen displayed on the operation unit 308 of the image forming apparatus 102.

When the panel application 404 detects that an OK button of the error display screen (in FIG. 15B) is pressed, the panel application 404 advances the processing to step SC1205 and ends the process.

If the panel application 404 determines that printing is successful (printing is not unsuccessful) (NO in step SC1203), the panel application 404 advances the processing to step SC1205 and ends the process.

The printing processing performed by the job management service 402 is described below.

In step SB1200, the job management service 402 starts processing. In step SB1201, the job management service 402 receives the print instruction command (transmitted in step SC1201) from the panel application 404. At this point, the job management service 402 also receives the GUID of the print job to be printed. If the delete command is transmitted therewith, the delete command is also received.

In step SB1202, the job management service 402 searches for the record corresponding to the GUID acquired in step SB1201 from the job management DB 403 in FIG. 4.

In step SB1203, the job management service 402 acquires the EMFSPOOL-format print job and the DEVMODE from the record acquired by search in step SB1202.

In step SB1204, the job management service 402 installs the printer driver. The present process is similar to that in step SB702, so that description thereof is omitted.

In step SB1205, the job management service 402 renders the EMFSPOOL-format print job and the DEVMODE acquired in step SB1203 and executes print process. At this point, there is used the logical printer in the output port of which the IP address of the image forming apparatus 102 receiving the print instruction command in step SB1201 is set. The printer driver forming the logical printer generates the PDL and transmits the PDL to the image forming apparatus 102.

In step SB1206, the job management service 402 transmits a result as to whether execution of printing is successful in step SB1205 to the panel application 404.

In step SB1207, the job management service 402 determines whether the delete command is included in the information received in step SB1201. If the job management service 402 determines that the delete command is included (YES in step SB1207), the job management service 402 advances the processing to step SB1208.

In step SB1208, the job management service 402 deletes the record searched in step SB1202 from the job management DB 403 and deletes the print job of the file path acquired in step SB1203. The job management service 402 advances the processing to step SB1209 and ends the process.

If the job management service 402 determines that the delete command is not included (NO in step SB1207), the job management service 402 advances the processing to step SB1209 and ends the process.

The above process allows the rendering result corresponding to the model of the image forming apparatus to be reflected in information to allow providing the user with more accurate information about the print job without performing implementation corresponding to each model of the image forming apparatus and each PDL on the panel application of the image forming apparatus.

The information about the print job is acquired after the EMFSPOOL-format print job is processed, so that the load of the print server (decrease in performance) can be reduced.

Even if the print setting is changed by the panel application of the image forming apparatus, analysis information can be acquired again from the print server at the time of changing the print setting, so that the user can accurately realize what result can be obtained at the time of changing the print setting before print output.

In the present exemplary embodiment, printing, processing, and analysis are performed by the print server. However, a part of them may be processed by the image forming apparatus. For example, if a storage device such as the HDD 304 is included in the image forming apparatus, the printer driver does not perform the local port printing and stores the PDL data in the storage device of the image forming apparatus. The PDL data may be analyzed by the image forming apparatus and displayed on a display unit of the operation unit of the image forming apparatus.

The display of the print setting change screen in FIG. 14B may include information about the number of sheets at the time of the image forming apparatus 102 actually outputting the selected job.

A "preview" button may be provided on the print setting change screen in FIG. 14B. If the button is pressed, the panel application 404 of the image forming apparatus 102 transmits a preview instruction to the print server 101. The job management service 402 of the print server 101 receiving the preview instruction executes the processing in steps SB1202 to SB1205 in FIG. 12 to transmit the PDL data to the image forming apparatus 102. The panel application 404 of the image forming apparatus 102 may receive the PDL data from the print server 101 to preview the PDL data on the display unit of the operation unit 308.

As described above, the present exemplary embodiment provides a printing system in which data to be printed are stored in the print server 101 in an intermediate format such as the EMFSPOOL-format independent of a specific image forming apparatus, and the print server 101 generates data (PDL data) dependent on the image forming apparatus 102 in response to a request from the image forming apparatus 102 and transmits the data to the image forming apparatus 102 to print the data therein. According to the present exemplary embodiment, even the print system can provide the user with more accurate information about the print job (the numbers of monochrome and color pages to be actually output, for example) without implementing the configuration for deriving information about results of output of the print job on the panel application 404 of the image forming apparatus 102 correspondingly with each model of the image forming apparatus 102 and each PDL.

As described above, the problem of the print system can be solved such that the EMFSPOOL-format intermediate data are stored in the print server, and the print server generates the PDL data in response to a request from the image forming apparatus and transmits print data to the image forming apparatus to print the data therein.

One exemplary embodiment is described above. However, the present invention can take the exemplary embodiment as a system, apparatus, method, program, or storage medium, for example. Specifically, the present invention may be applied to a system formed of a plurality of apparatuses or an apparatus formed of one appliance. All configurations in which the above exemplary embodiments are combined with one another are included in the present invention. In an example, a computer-readable medium may store a program that causes an information processing apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-044392 filed Mar. 1, 2011, which is hereby incorporated by reference herein in its entirety.

What is claimed is:

1. An information processing apparatus comprising:
a storage unit configured to store data to be printed in an intermediate format independent of a specific model of a printing apparatus and information about print setting corresponding to data of the intermediate format;
an installation unit configured to install a printer driver corresponding to a printing apparatus in response to a request from the printing apparatus;
a processing unit configured to cause the printer driver installed by the installation unit to generate, from the intermediate-format data and the stored information about the print setting corresponding to the data of the intermediate format, data capable of recognizing output settings used for actual printing by the printing apparatus and output the generated data to a storage area inside the information processing apparatus; and a transmission unit configured to acquire information about the output settings from the data output by the processing unit and to transmit the information about the output settings to the printing apparatus;

a change unit configured to change the stored information about the print setting corresponding to the data of the intermediate format in response to an instruction for changing print setting received from the printing apparatus; and a control unit configured to cause the transmission unit to retransmit the information about the output settings acquired from the data regenerated and output by the processing unit along with the change of the stored information about the print setting, wherein the printing apparatus displays the information about the output settings of the data to be printed.

2. The information processing apparatus according to claim 1, further comprising a print processing unit configured to generate data dependent on the printing apparatus from the intermediate-format data using the printer driver in response to a request from the printing apparatus and to output the generated data dependent on the printing apparatus to the printing apparatus.

3. The information processing apparatus according to claim 1, wherein the information about the output settings includes information about a number of sheets to be actually output by the printing apparatus.

4. The information processing apparatus according to claim 1, wherein the information about the output settings includes information about numbers of monochrome and color pages to be actually output by the printing apparatus.

5. The information processing apparatus according to claim 1, wherein the processing unit causes the printer driver to replace data to be printed of each page with pseudo data and then generate data capable of recognizing used for actual printing by the printing apparatus.

6. The information processing apparatus according to claim 5, wherein the pseudo data correspond to color information about data to be printed of each page.

7. The information processing apparatus according to claim 1, wherein the intermediate format refers to Enhanced Metafile Spool Format (EMFSPOOL format).

8. The information processing apparatus according to claim 1, wherein the processing unit causes the printer driver to generate page-description language (PDL) data.

9. A method for controlling an information processing apparatus, the method comprising:
storing, in a storage unit, data to be printed in an intermediate format independent of a specific model of a printing apparatus and information about print setting corresponding to data of the intermediate format;
installing a printer driver corresponding to a printing apparatus in response to a request from the printing apparatus;
causing the installed printer driver to generate, from the intermediate-format data and the stored information about the print setting corresponding to the data of the intermediate format, data capable of recognizing output settings used for actual printing by the printing apparatus and output the generated data to a storage area inside the information processing apparatus;
acquiring information about the output settings from the output data and transmitting the information about the output settings to the printing apparatus;
changing the stored information about the print setting corresponding to the data of the intermediate format in response to an instruction for changing print setting received from the printing apparatus; and
causing a retransmit of information about output settings acquired from the data regenerated and output along with the change of the stored information about the print setting,
wherein the printing apparatus displays the information about the output settings of the data to be printed.

10. A non-transitory computer-readable medium storing a program to cause an information processing apparatus to perform the method according to claim 9.

11. A printing system, comprising:
an information processing apparatus having:
a storage unit configured to store data to be printed in an intermediate format independent of a specific model of a printing apparatus and information about print setting corresponding to data of the intermediate format,
an installation unit configured to install a printer driver corresponding to a printing apparatus in response to a request from the printing apparatus,
a processing unit configured to cause the printer driver installed by the installation unit to generate, from the intermediate-format data and the stored information about the print setting corresponding to the data of the intermediate format, data capable of recognizing output settings used for actual printing by the printing apparatus and output the generated data to a storage area inside the information processing apparatus,
a transmission unit configured to acquire information about the output settings from the data output by the processing unit and to transmit the information about the output settings to the printing apparatus;
a change unit configured to change the stored information about the print setting corresponding to the data of the intermediate format in response to an instruction for changing print setting received from the printing apparatus, and
a control unit configured to cause the transmission unit to retransmit the information about output settings acquired from the data regenerated and output by the processing unit along with the change of the stored information about the print setting; and
the printing apparatus, wherein the printing apparatus includes:
a request unit configured to request the information processing apparatus to provide information about the data to be printed; and
a display unit configured to display the information about the output settings of the data to be printed received from the information processing apparatus.

12. A method for controlling a printing system including an information processing apparatus and a printing apparatus, the method comprising:
storing, in a storage unit of the information processing apparatus, data to be printed in an intermediate format independent of a specific model of a printing apparatus and information about print setting corresponding to data of the intermediate format;
installing, on the information processing apparatus, a printer driver corresponding to a printing apparatus in response to a request from the printing apparatus;
causing the installed printer driver to generate, from the intermediate-format data and the stored information about the print setting corresponding to data of the intermediate format, data capable of recognizing output settings used for actual printing by the printing apparatus and output the generated data to a storage area inside the information processing apparatus;

acquiring information about the output settings from the output data and transmitting the information about the output settings from the information processing apparatus to the printing apparatus;

changing the stored information about the print setting corresponding to data of the intermediate format in response to an instruction for changing print setting received from the printing apparatus;

requesting, via the printing apparatus, the information processing apparatus to provide information about the data to be printed;

causing a retransmit of information about output settings acquired from the data regenerated and output along with the change of the stored information about the print setting; and displaying, on the printing apparatus, the information about the output settings of the data to be printed received from the information processing apparatus.

\* \* \* \* \*